United States Patent [19]

Ruder et al.

[11] Patent Number: 5,067,867
[45] Date of Patent: Nov. 26, 1991

[54] CONVEYOR FOR MIXED FREIGHT HANDLING SYSTEM

[75] Inventors: Carl J. Ruder; Ronald J. Haney, both of Overland Park, Kans.; Richard J. Chutorash, Portland; Wayne W. Bostad, Forest Grove, both of Oreg.; Arnold A. Zweig, Olympia, Wash.; Lyle B. Payne, Stilwell, Kans.

[73] Assignee: Yellow Freight System, Inc., Overland Park, Kans.

[21] Appl. No.: 641,070

[22] Filed: Jan. 14, 1991

Related U.S. Application Data

[62] Division of Ser. No. 280,720, Dec. 6, 1988, Pat. No. 5,009,560.

[51] Int. Cl.$^5$ ............................................. B65G 67/08
[52] U.S. Cl. ................................... 414/391; 414/398; 414/399; 414/786; 414/528; 198/589; 198/592
[58] Field of Search ............... 414/373, 390, 391, 392, 414/398, 395, 665, 667, 669, 786, 789.6, 666, 399, 527, 528, 389, 393, 574; 198/588, 589, 592, 594; 901/6, 7, 8

[56] References Cited

U.S. PATENT DOCUMENTS

| | | |
|---|---|---|
| 901,949 | 10/1908 | Brown et al. |
| 1,626,948 | 5/1927 | Manierre |
| 2,660,432 | 11/1953 | Wilske et al. |
| 2,843,278 | 7/1958 | Oveflander |
| 3,209,926 | 10/1965 | McWilliams |
| 3,442,403 | 5/1969 | Weir |
| 3,613,910 | 10/1971 | Weir |
| 3,651,963 | 3/1972 | McWilliams |

(List continued on next page.)

FOREIGN PATENT DOCUMENTS

| | | | |
|---|---|---|---|
| 29817 | 6/1981 | European Pat. Off. | |
| 1556087 | 1/1970 | Fed. Rep. of Germany | 198/592 |
| 2231495 | 1/1974 | Fed. Rep. of Germany | |
| 2352738 | 1/1978 | France | |
| 57-141323 | 9/1982 | Japan | 414/393 |
| 58-193834 | 11/1983 | Japan | |
| 59-31224 | 2/1984 | Japan | |
| 61-211237 | 9/1986 | Japan | |
| 62-275930 | 11/1987 | Japan | |
| 63-71031 | 3/1988 | Japan | |
| 7707862 | 1/1979 | Sweden | |
| 639919 | 12/1983 | Switzerland | |
| 228606 | 1/1969 | U.S.S.R. | |
| 2200613 | 8/1988 | United Kingdom | 198/589 |
| WO88/06567 | 9/1988 | World Int. Prop. O. | |

OTHER PUBLICATIONS

Hartley, John, "Specialisation Is the Watchword on Tokyo Robot Show Stands", The Engineer Magazine, Nov. 3, 1977, pp. 65-67.

Primary Examiner—Robert J. Spar
Assistant Examiner—Robert S. Katz
Attorney, Agent, or Firm—Litman, McMahon & Brown

[57] ABSTRACT

A mixed freight handling system, particularly for limited access areas such as an end-opening trailer at a dock, includes a telescoping conveyor overlapping a fixed conveyor and translatable into the trailer to receive hand liftable articles. A freight manipulator includes an appropriate and changeable freight manipulator tool mounted on an extendible boom and is translatable adjacent and along the conveyors to the dock edge. The tool is extendible into the trailer for engaging and supporting manually nonliftable freight for transfer to or from a freight conveyor extending alongside the path of the manipulator. The telescoping conveyor includes a base section engaged with a track, an inclinable lift section, and a liftable and laterally swingable head section. The manipulator includes a chassis engaged with a track straddling the fixed and telescoping conveyors and has a tunnel formed therethrough, allowing the passage of articles on the conveyors therebeneath. The extendible boom is attached to the chassis and is supported at an outer end by a wheeled bogie. The telescoping conveyor and manipulator cooperate in such a manner that the manipulator can be extended into the trailer without retraction of the telescoping conveyor.

14 Claims, 14 Drawing Sheets

U.S. PATENT DOCUMENTS

| | | |
|---|---|---|
| 3,715,043 | 2/1973 | Weir . |
| 3,779,404 | 12/1973 | McWilliams . |
| 3,782,566 | 1/1974 | McWilliams . |
| 3,785,508 | 1/1974 | Hayden . |
| 3,788,496 | 1/1974 | Webb et al. . |
| 3,792,785 | 2/1974 | Weir . |
| 3,811,579 | 5/1974 | Black . |
| 3,819,068 | 6/1974 | Weir . |
| 3,827,585 | 8/1974 | McWilliams . |
| 3,836,021 | 9/1974 | McWilliams . |
| 3,842,962 | 10/1974 | Grachev et al. . |
| 3,853,230 | 12/1974 | Schultz . |
| 3,866,768 | 2/1975 | Weir . |
| 3,937,346 | 2/1976 | van der Laan . |
| 3,952,887 | 4/1976 | Lutz . |
| 3,998,345 | 12/1976 | Fiehler et al. . |
| 4,088,221 | 5/1978 | Bowser . |
| 4,128,183 | 12/1978 | Finlayson . |
| 4,171,178 | 10/1979 | Birkenfeld et al. . |
| 4,189,271 | 2/1989 | Hasegawa . |
| 4,252,495 | 2/1981 | Cook . |
| 4,281,955 | 8/1981 | McWilliams . |
| 4,425,069 | 1/1984 | Saur et al. . |
| 4,483,559 | 5/1989 | Gebbart . |
| 4,780,041 | 10/1988 | Ashby, Jr. . |
| 4,783,904 | 11/1988 | Kimura . |
| 4,787,803 | 11/1988 | van Elten et al. . |
| 4,828,102 | 5/1989 | Dotsen et al. ......................... 198/588 |
| 4,896,764 | 1/1990 | Neunzert ......................... 198/594 X |

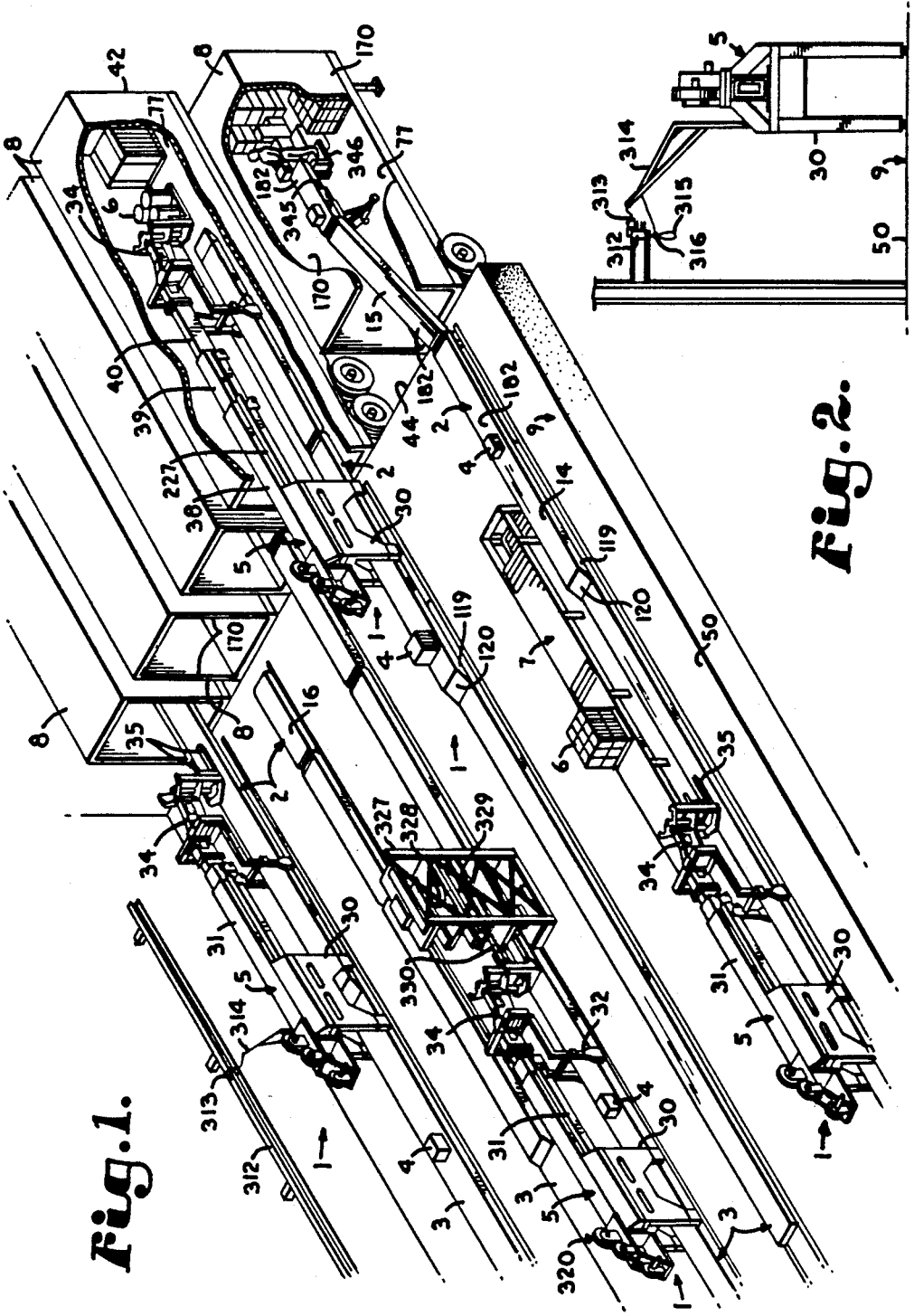

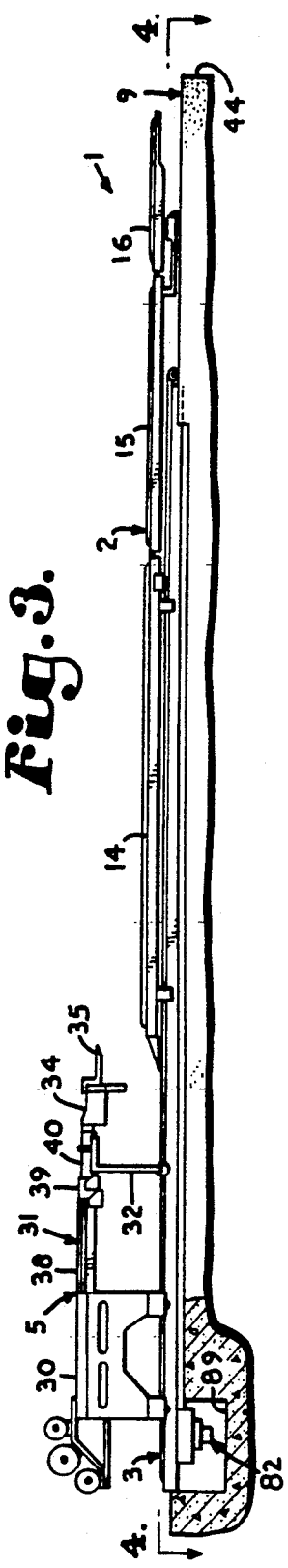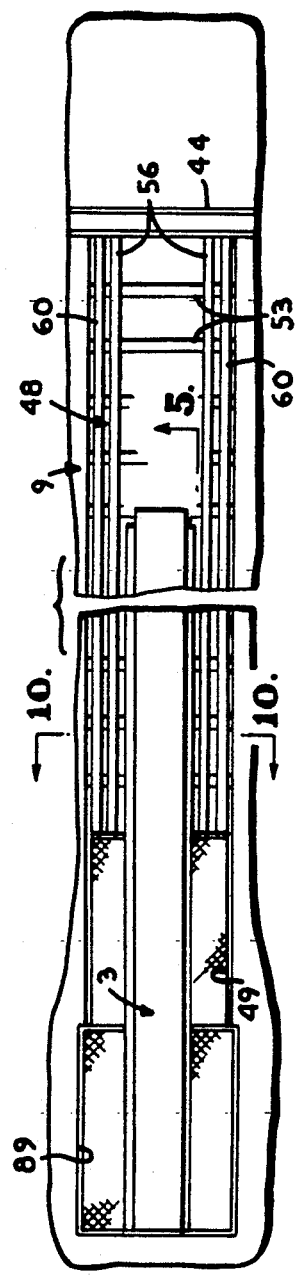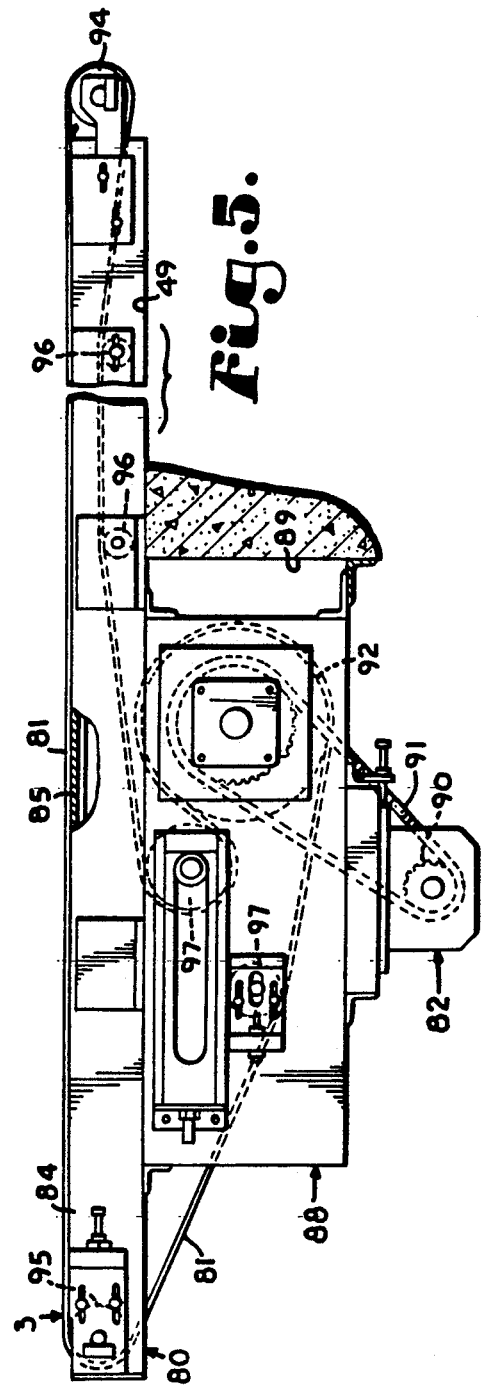

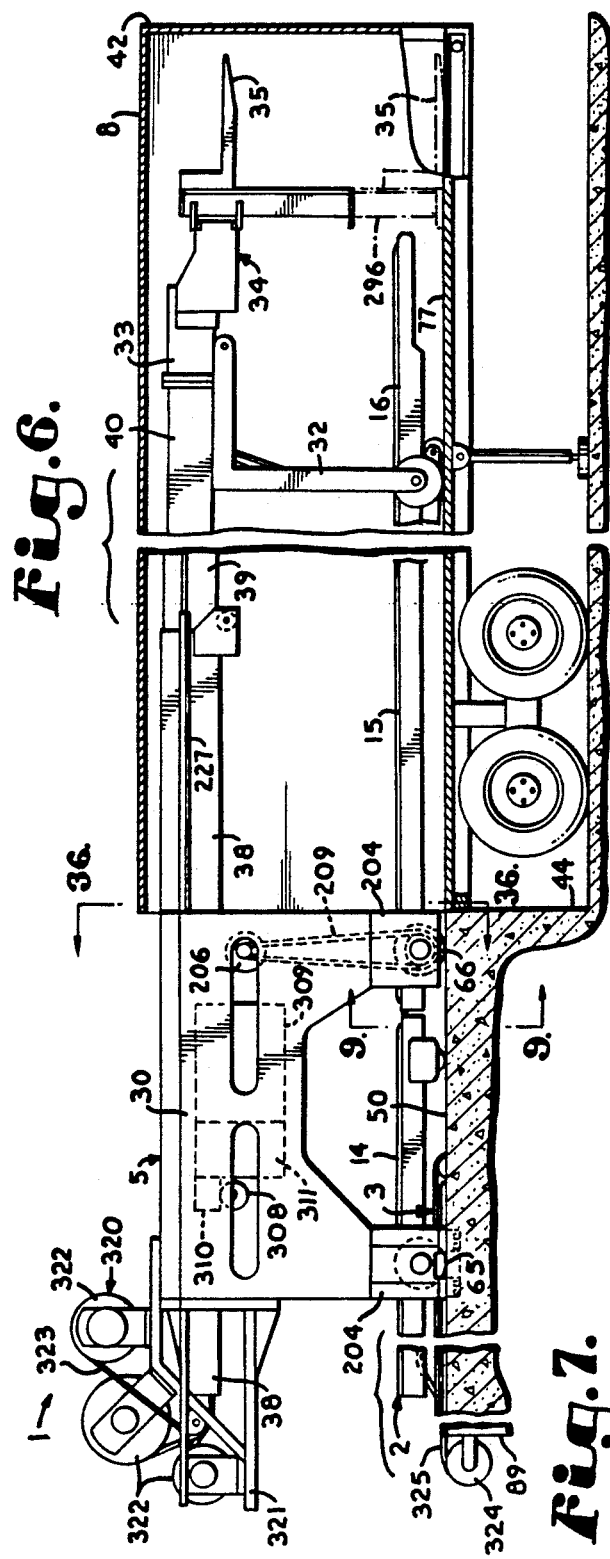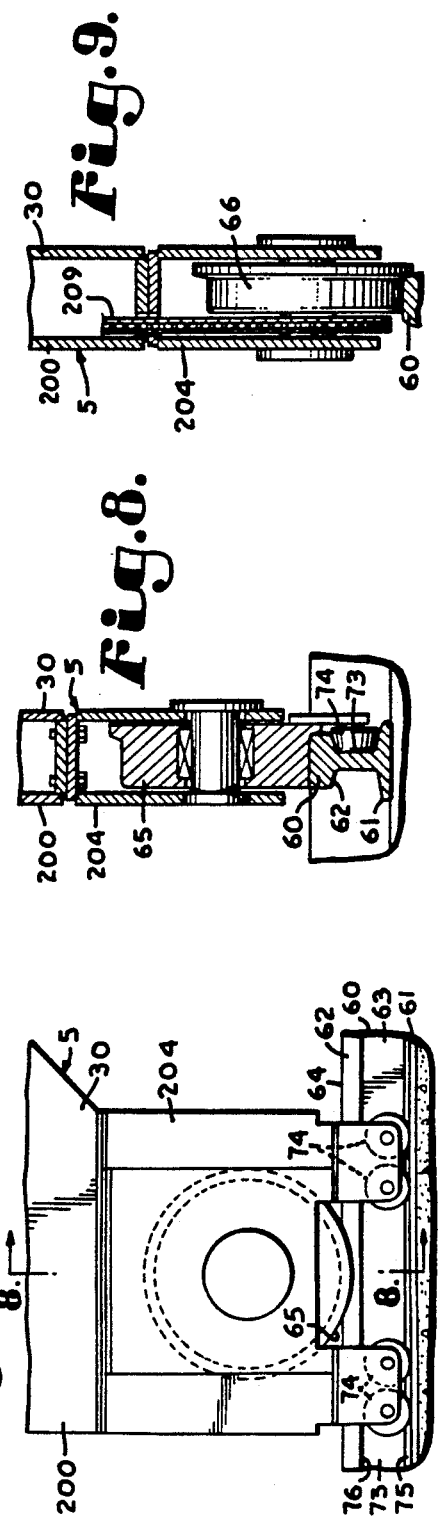

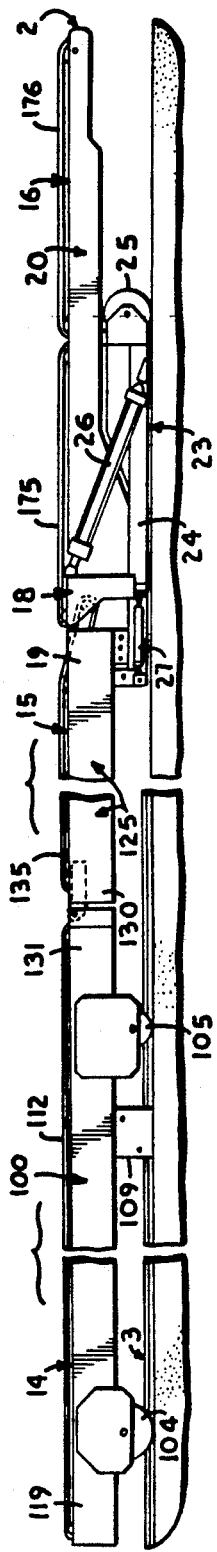
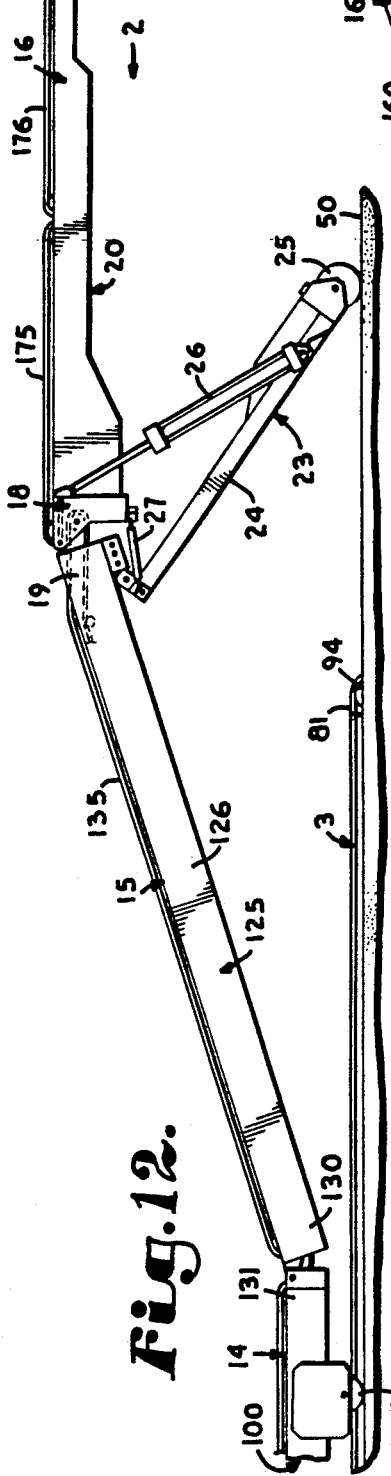
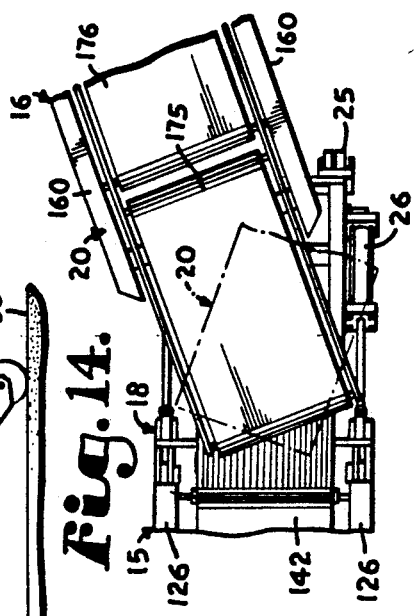
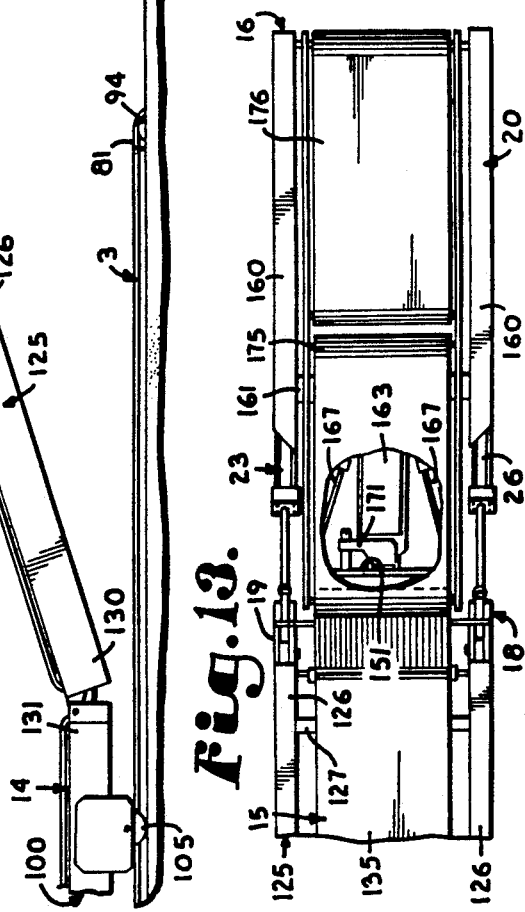

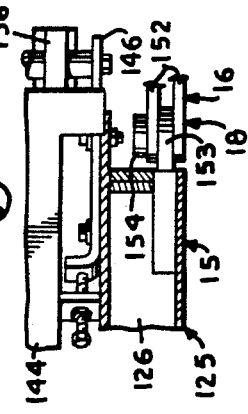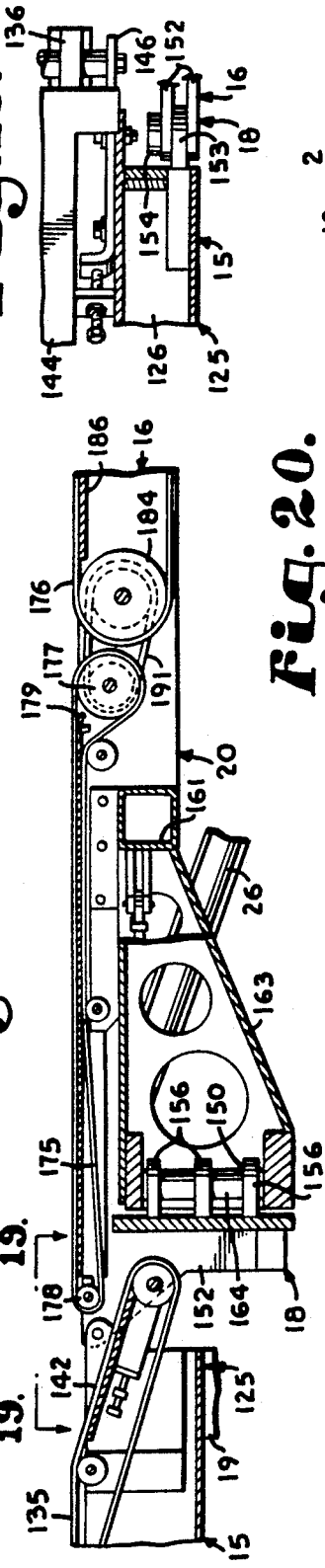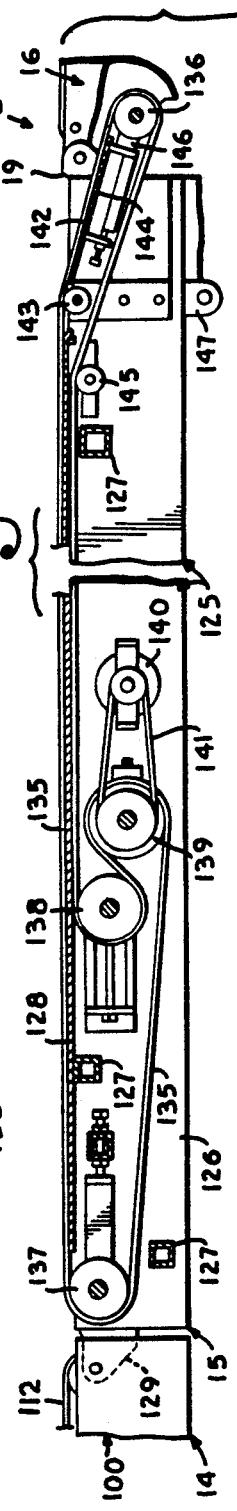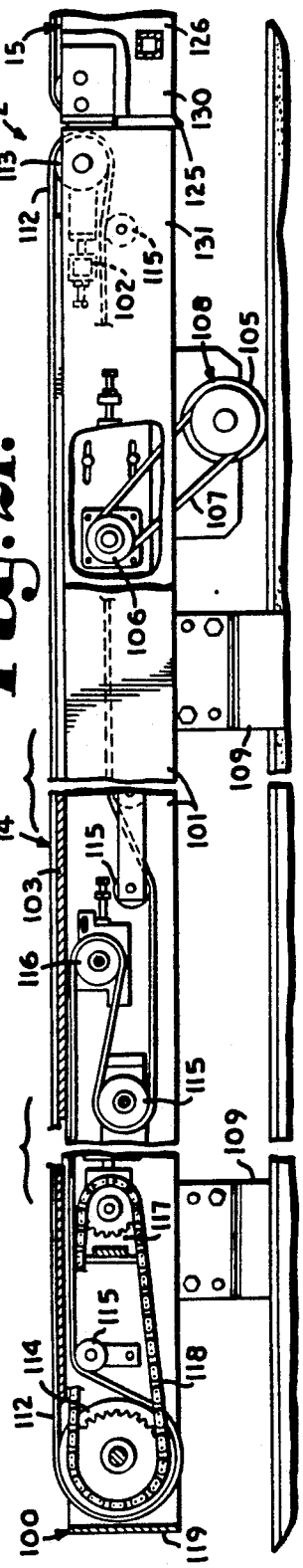

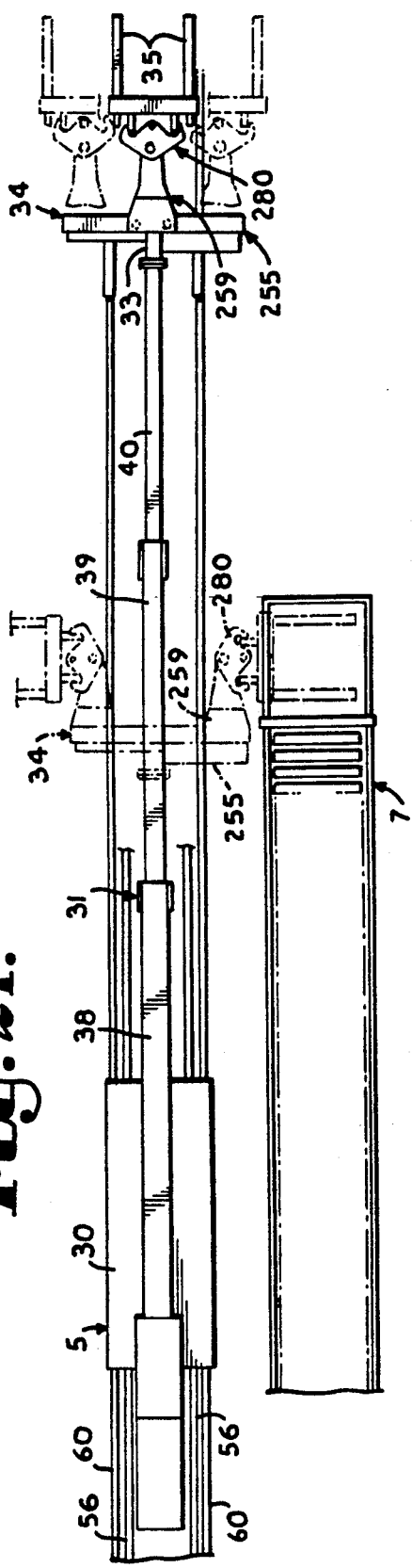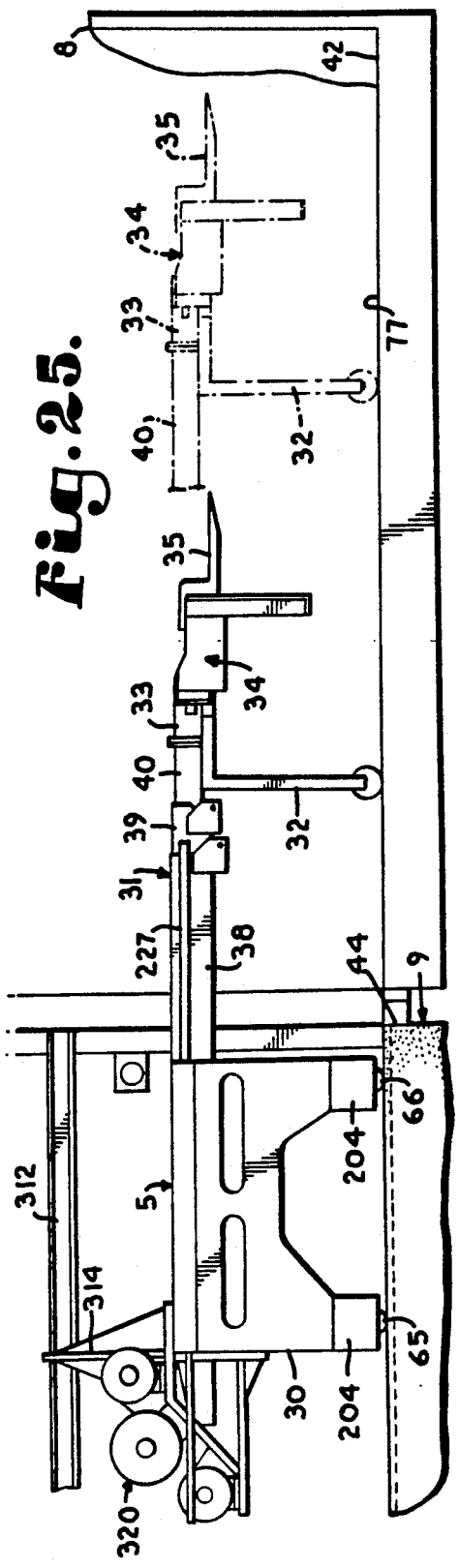

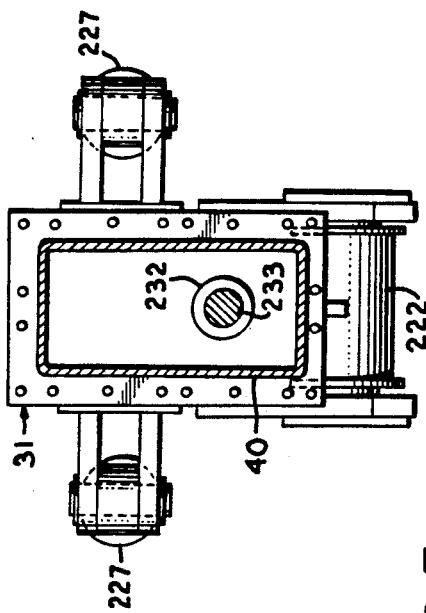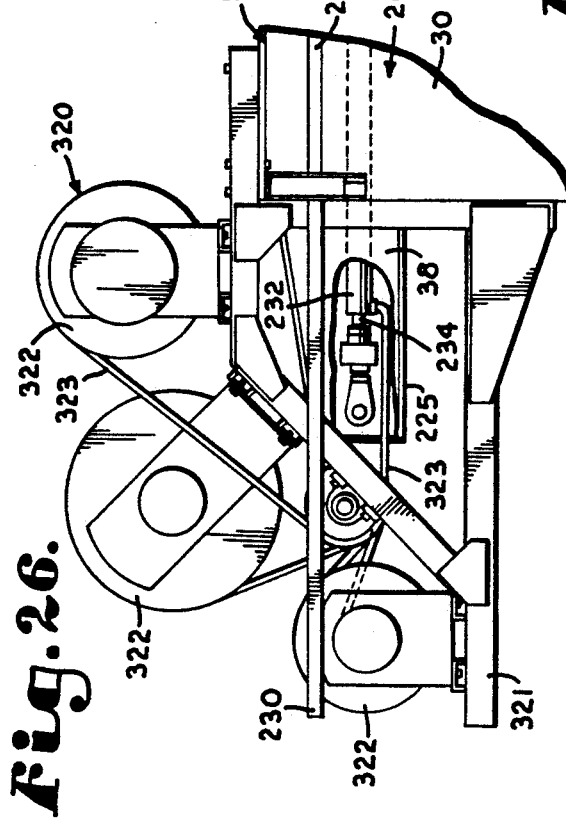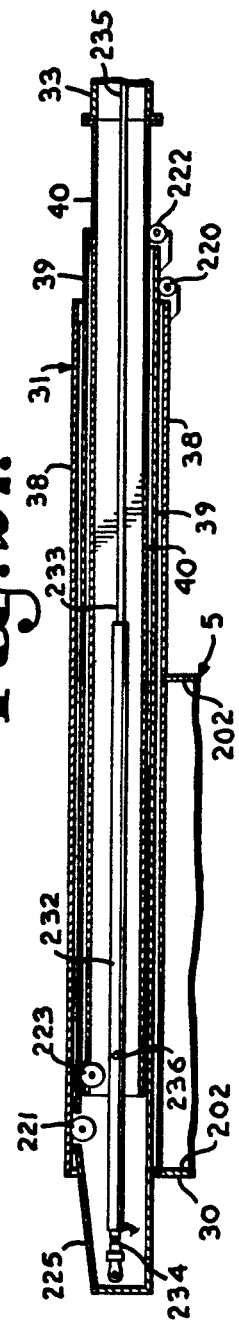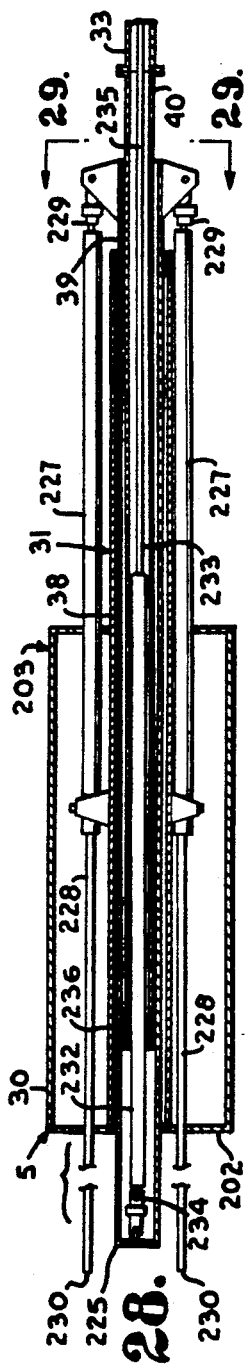

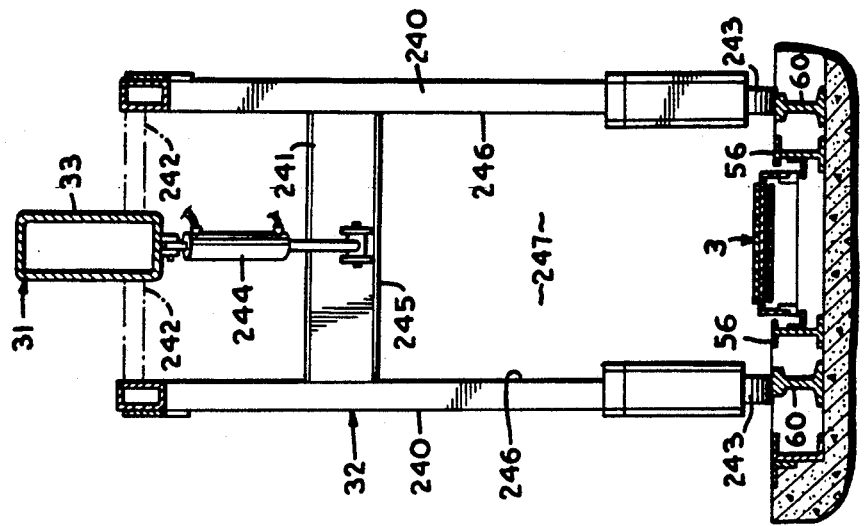
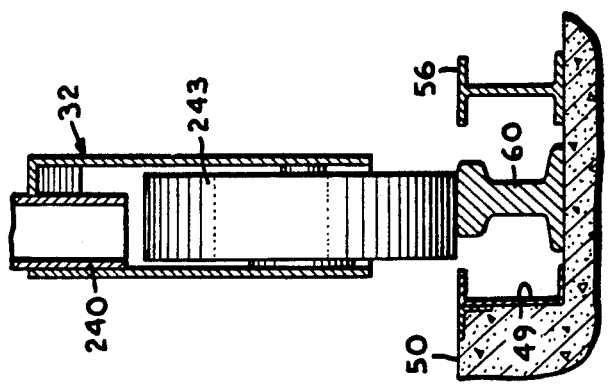
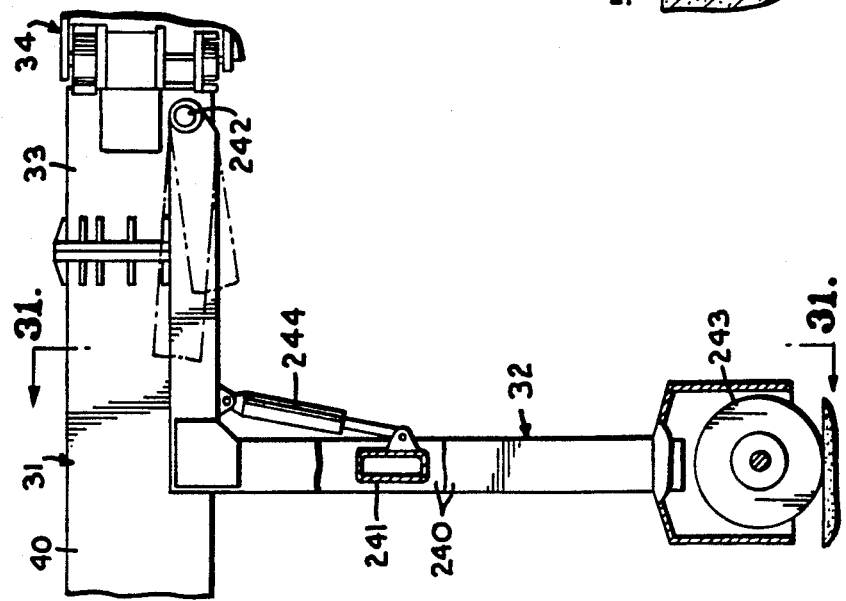

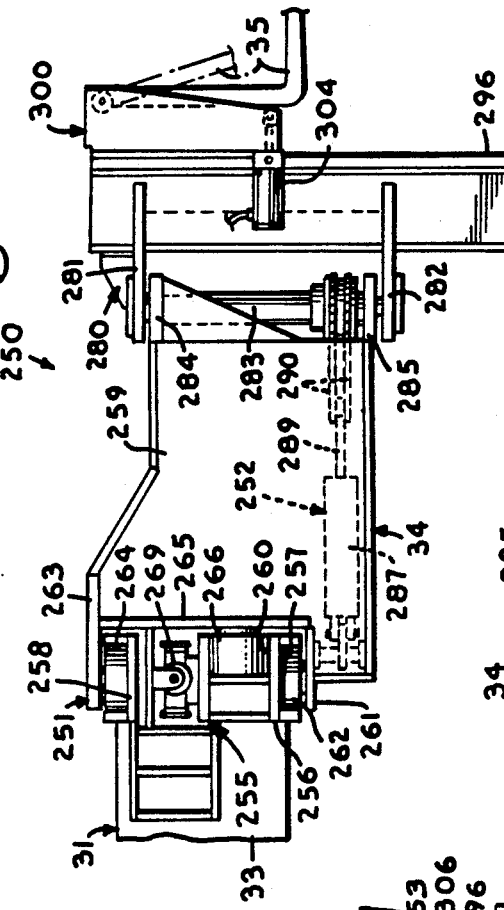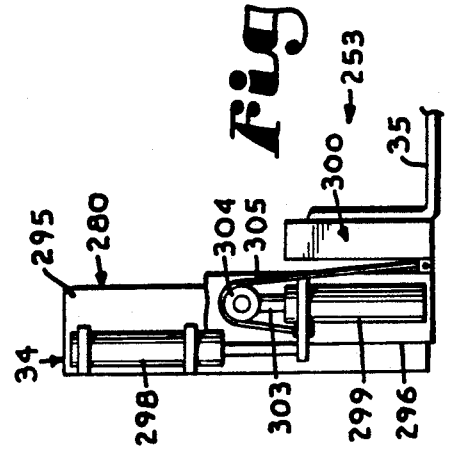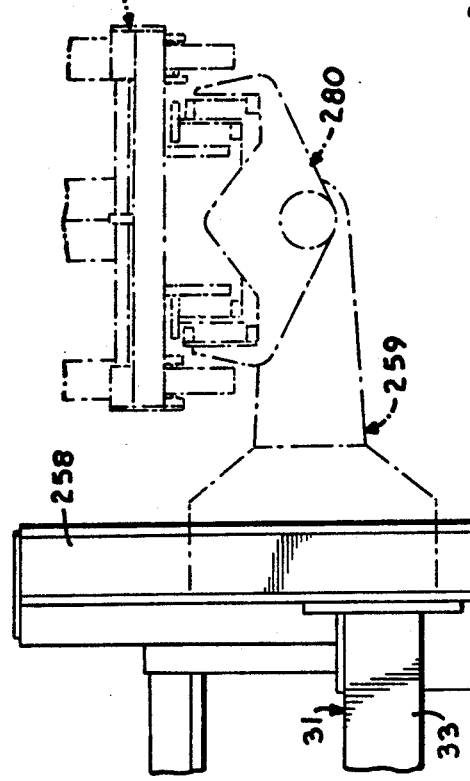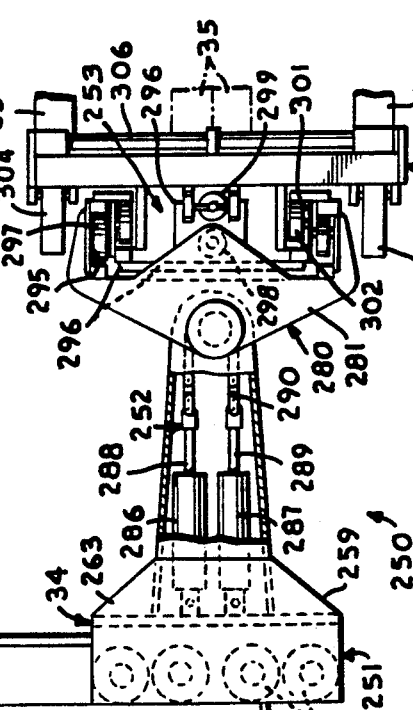

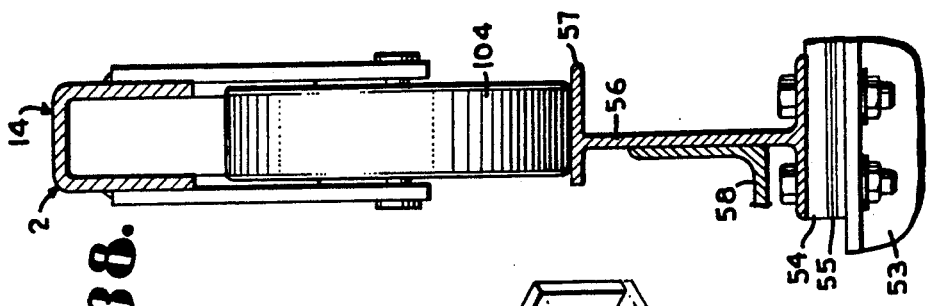
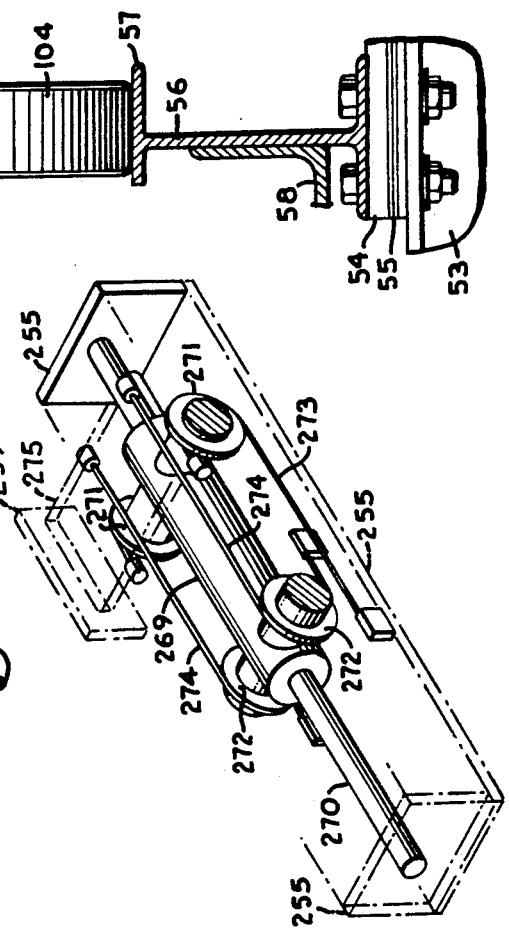
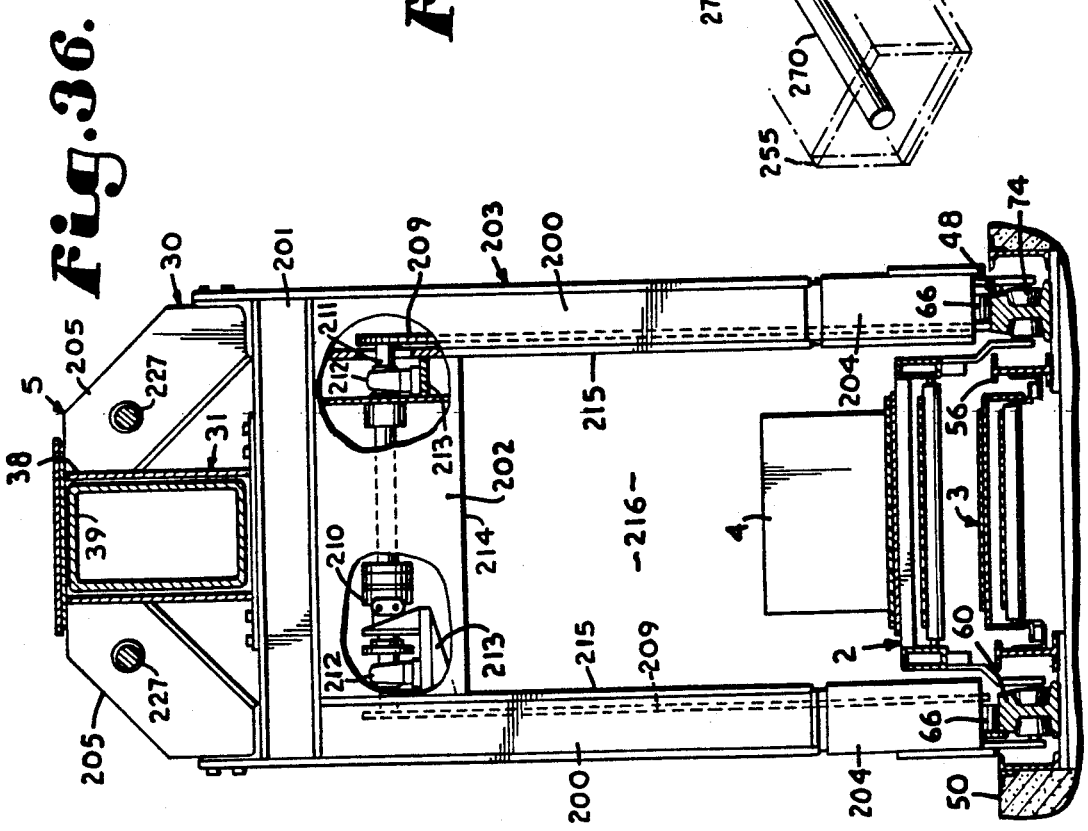

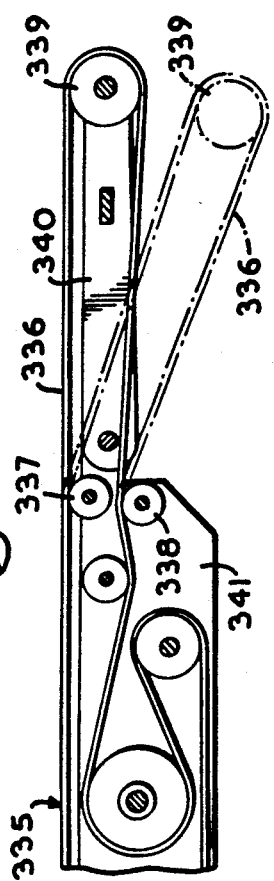
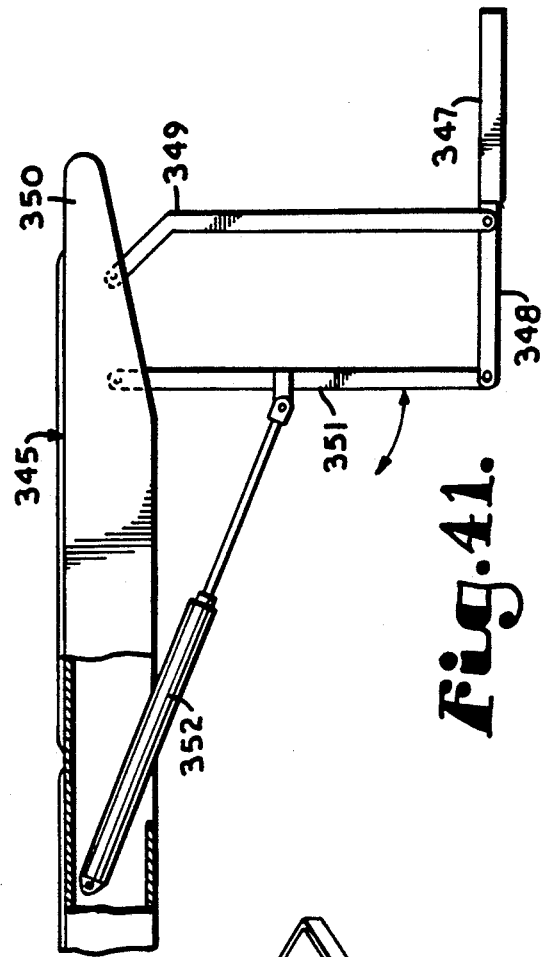
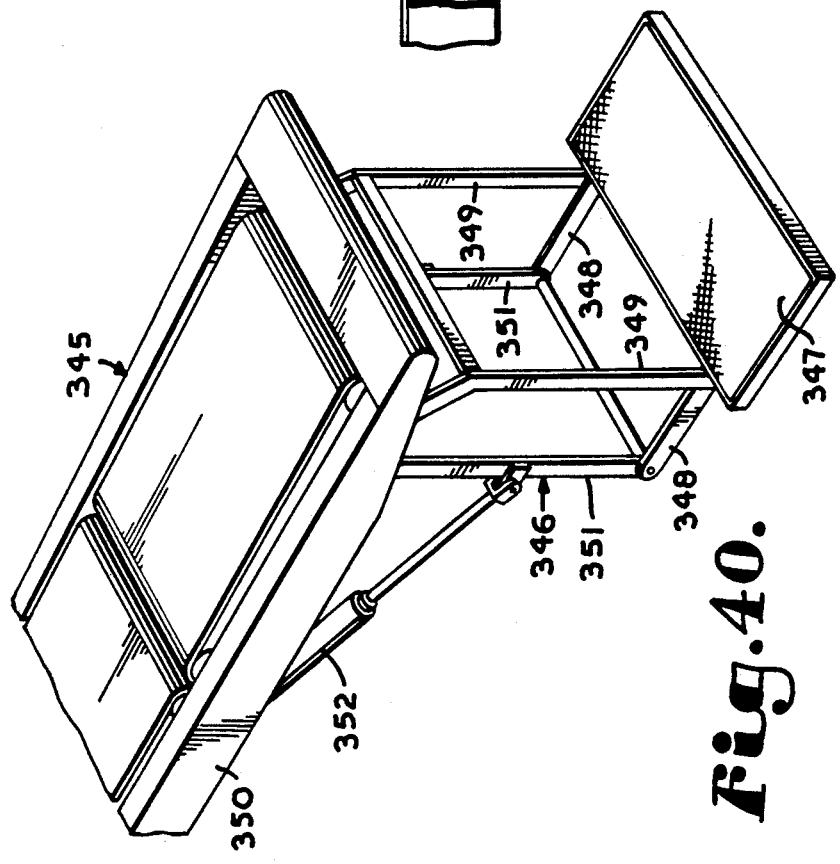

CONVEYOR FOR MIXED FREIGHT HANDLING SYSTEM

CROSS-REFERENCE TO RELATED APPLICATION

This is a division of application Ser. No. 07/280,720, filed Dec. 6, 1988, now U.S. Pat. No. 5,009,560.

FIELD OF THE INVENTION

The present invention relates to article shipping and handling systems and, more particularly, to a mixed freight handling system for transferring a mixed load of hand liftable articles and heavy or bulky freight between a truck trailer and a dock.

BACKGROUND OF THE INVENTION

There are many systems available and in use for efficiently loading and unloading truck trailers with relatively uniform types of freight. For example, if a trailer is loaded only with hand liftable cartons, the trailer may be unloaded entirely manually, as onto pallets on a dock; or a conveyor may be extended into the trailer, and the cartons manually placed on the conveyor. Similarly, if a trailer is loaded only with palleted freight, it may be unloaded fairly efficiently using a conventional fork lift truck.

In some trucking operations, particularly larger general freight carriers, a great variety of freight may be shipped from a number of diverse origins to a central facility for local or distant transshipment. At the central facility, freight from the arriving trucks is unloaded, sorted according to destination, then reassembled into loads in such a manner as to most economically utilize the trucks. Because of the nature of this kind of shipping operation, trucks often arrive at a central facility with mixed freight loads, hand liftable articles interspersed with palleted freight and other types of bulky or heavy articles which are not suitable for manual unloading. Such mixed freight loads are often referred to as "LTL" freight for "Less (than) Truck Load".

In the past, the utilization of labor and equipment in unloading such LTL trailers has often been inefficient and uneconomical. Because of the indeterminate mix of manually liftable freight and freight requiring mechanized handling and the uncertainty of arrival times of trucks, it is often difficult to provide an optimum combination of labor and equipment to assure that the laborers are not overworked at certain times and left idle at others. On some docks, only certain designated persons may be permitted to operate fork lift trucks, for reasons of safety or labor contract requirements. Also, a single fork lift truck or conveyor may be required to service multiple dock positions. As different types of freight are encountered in unloading the trailer, workers are often left standing about idly as equipment is awaited and changeover thereof occurs. If unloading conveyors are employed in the trailers to receive manually liftable articles, time and effort are consumed in extending and retracting the conveyors as different types of freight are encountered.

In loading truck trailers with mixed types of freight for offloading at several locations, it is desirable to position the freight in such a manner as to minimize handling at each stop. Thus, a load for a first stop is positioned rearmost in the trailer, and a load for a last stop is positioned toward the front of the trailer. Problems similar to those encountered in unloading mixed freight occur in loading mixed freight onto trailers.

The results of such inefficiency, among other disadvantages, are that dock workers and unloading equipment are inefficiently employed and the docks and truck trailers are tied up awaiting loading or unloading. Shipping costs are thereby increased and profits to the warehousing facility and/or trucking company are diminished.

SUMMARY OF THE INVENTION

The present invention provides methods and apparatus to overcome many of the problems associated with the conventional manner of handling mixed loads of freight. The present invention is particularly directed to unloading mixed freight. However, with the disclosed structure or appropriate modifications thereof, the methods and apparatus described below are also applicable to loading mixed freight. In general, the present invention combines a conveyor extendible into a trailer to receive hand liftable articles with a freight manipulator extendible into the trailer without removal of the conveyor to engage and unload freight which is not hand liftable.

The extendible conveyor preferably includes a rear base section, a middle lift section, and a front head section and is supported by surface engaging wheels which ride on conveyor support rails on the dock floor and on the bed of a trailer when extended. The base section is engaged with guide tracks which run parallel to the support rails. The extendible conveyor overlaps a fixed conveyor to which articles are communicated or transferred by the extendible conveyor. The lift section is pivotally connected to the base section for pivoting about a lateral axis. The head section includes a pitch frame connected to the lift section for pivoting about a lateral axis or pitching and a swing frame connected to the pitch frame for pivoting about a vertical axis or swinging. Lift struts are pivotally connected to a front end of the lift section, and hydraulic lift cylinders are pivotally connected between the struts and the pitch frame of the head section. Leveling links are pivotally connected between inner ends of the struts and the sides of the pitch frame such that when the cylinders are extended to lift the head section, the links cause the head section to remain substantially level. The sections of the extendible conveyor are provided with endless conveyor belts which are independently driven by motors mounted in the respective sections.

The extendible conveyor is translated or telescoped along the support rails by a motor drivingly engaged with drive wheels mounted on the base section. The lift and head sections are extendible up to and into a trailer parked at the dock. The extendible conveyor is adapted to receive hand liftable articles, such as cartons, from the trailer and convey them to the fixed conveyor which may communicate with another conveyor such as a sorting conveyor system, an accumulation conveyor, or the like. The raisable head section facilitates unloading articles which are stacked on other freight such that a worker is usually not required to actually lift articles, only "swing" them onto the head section. The ability of the head section to swing to the right or left facilitates unloading articles positioned in the trailer off the center line.

The freight manipulator includes a translatable chassis mounted on tracks parallel to and outside of the guide tracks of the extendible or telescoping conveyor and a boom, preferably extendible, having a freight engaging tool mounted on a front end thereof. The chassis is shaped internally to form a tunnel through which the fixed and extendible conveyors are directed. This feature allows articles to be conveyed on these conveyors through the manipulator chassis and allows the tool carriage of the manipulator to be extended into a trailer over the lowered head section of the conveyor without retraction thereof. The chassis is supported by rimmed wheels on rails which may be the same rails which guide the extendible conveyor. The chassis wheels are journaled on chassis legs which are spaced apart to straddle the extendible and fixed conveyors when passing thereover. The chassis is self propelled by a motor arrangement drivingly engaged with chassis wheels and can be translated up to near the edge of the dock to extend the boom into the open end of a trailer parked at the dock. The boom is positioned to cause the tool carriage to engage freight therein.

The boom, in one form, is comprised of telescoping sections including an outer rear section attached to the chassis, a middle section sleeved within the rear section, and an inner front section sleeved within the middle section. A pair of hydraulic middle section extension cylinders are connected between the middle and rear sections of the boom and are positioned external to the rear and middle sections. A hydraulic front section extension cylinder is connected between the middle section and the front section and is positioned within the middle and front section. The front section has a tool support carriage base at a front end thereof. A tool support carriage is connected to the carriage base by tool articulation means such that the tool carriage is liftable and lowerable with respect the carriage base, pivotable about a vertical axis from left 180 degrees around to right, shiftable laterally, and tiltable fore and aft to a small degree. The carriage base is supported by a wheeled bogie which is extendible and retractable a short distance to accommodate trailer beds which are not precisely coplanar with the dock floor and which might rise as the trailer is unloaded. A variety of freight manipulating tools are attachable to the tool support carriage, such as fork extensions, a rug pole, drum clamps, jib boom, etc.

A freight or manipulator conveyor is positioned alongside the manipulator track and is adapted to receive freight removed from the trailer by the manipulator. The lateral shifting feature of the tool carriage allows freight on the sides of the trailer to be engaged and lifted using the lift feature. The pivoting feature of the tool carriage allows the freight to be deposited onto the freight conveyor. In a loading situation, the freight is removed from the freight conveyor and placed in the trailer by the manipulator.

The manipulator preferably has its own hydraulic pump driven by electrical power transmitted to the manipulator by way of a power rail extending alongside the path of the manipulator. A system of reels on the manipulator pays out hydraulic hoses to the internal extension cylinder and to the cylinders which articulate the tool support carriage. In a preferred form, the manipulator is adapted to automatically execute a number of functions, such as parking in a fully retracted condition, retraction of the boom and placement of a load on the manipulator conveyor, and the changeover of freight engaging tools.

The extendible conveyor and freight manipulator cooperate to allow efficient unloading and loading of a trailer. The extendible conveyor is extended along the fixed conveyor into the trailer to receive and convey hand liftable articles. When a palleted load of freight or other manually nonliftable freight is encountered, the extendible conveyor may be lowered, if necessary; and the freight manipulator controlled to extend the manipulator tool into the trailer over the lowered extendible conveyor to engage the freight. It is not necessary to retract the extendible conveyor to allow entry of the manipulator tool support carriage and boom support bogie into the trailer. Articles still on the extendible and fixed conveyors are not disturbed but merely conveyed through the manipulator chassis tunnel. When the freight has been engaged, the freight manipulator is controlled to automatically retract the boom and translate the manipulator chassis to an appropriate position to place the freight on the freight conveyor and park itself. Meanwhile, a worker may resume placing hand liftable articles onto the telescoping conveyor as the manipulator withdraws.

OBJECTS OF THE INVENTION

The principal objects of the present invention are: to provide an improved system for unloading mixed freight from truck trailers; to provide such a system including an extendible or telescoping conveyor which is translatable into a trailer for conveying manually liftable articles; to provide such a system with an independently translatable freight manipulator with a chassis straddling the conveyor and translatable to the edge of a dock to extend a freight lift member such as fork tines into the trailer to engage nonmanually liftable freight, such as palleted loads and the like; to provide such a system wherein the extendible conveyor overlaps and communicates with a fixed conveyor; to provide such a system wherein the extendible conveyor includes a head section connected by an inclinable lift section to a base section, the head section being liftable to facilitate unloading of stacked articles and swivelable to facilitate unloading articles positioned laterally within the trailer; to provide such a system wherein the head section of the extendible conveyor includes a collapsible worker platform to lift a worker to facilitate reaching stacked articles within the trailer; to provide such a system wherein a telescoping conveyor is positioned on a conveyor track extending to near the edge of the dock, the conveyor being supported on wheels which engage the bed of the trailer within the trailer; to provide such a system wherein the manipulator chassis is mounted on manipulator tracks parallel to and outside of the conveyor tracks and has a tunnel therethrough for passage of articles on the telescoping and fixed conveyors through the chassis and for independent translation of the manipulator relative to the telescoping conveyor; to provide such a system wherein the manipulator includes a tool carriage connected to the chassis by an extendible boom and supported by a wheeled bogie which allows a freight engaging tool to be extended to the front end of a standard size trailer; to provide such a system wherein a variety of freight engaging tools, such as fork tines and extensions, a drum clamp, a rug pole, jib boom, or the like, are interchangeably connectable to the tool carriage for handling a variety of types of freight; to provide such a system wherein the tool carriage is capable of a wide range of articulation, such as lateral shifting to engage freight positioned on the extreme sides of a trailer, pivoting through at least 180 degrees about a vertical axis, tilting, and the like; to provide such a system including a freight conveyor extending along beside the manipulator tracks to receive freight from the manipulator; to provide such a system wherein the manipulator is programmed for certain automatic functions such as the translation of the chassis to the extremities of the manipulator tracks, the retraction of the boom and translation of the manipulator to a position to set off a unit of freight onto the freight conveyor, the interchanging of freight engaging tools, parking of the manipulator, and the like; to provide such a system wherein the telescoping conveyor in an extended and lowered condition may remain in the trailer without interference as the tool carriage of the manipulator is extended into the trailer to engage a unit of nonmanually liftable freight; to provide such a system which can be operated by a single worker to unload a trailer; to provide such a system which with or without appropriate modifications may be used to load trailers; and to provide such a mixed freight handling system which is economical to manufacture, efficient and convenient in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 1 is a perspective view of a plurality of the mixed freight handling systems embodying the present invention installed at a truck dock.

FIG. 2 is a rear elevational view of a freight manipulator of the mixed freight handling system and a power rail which provides electrical power therefor.

FIG. 3 is a side elevational view of a telescoping conveyor, freight manipulator, and fixed conveyor of the mixed freight handling system according to the present invention.

FIG. 4 is a fragmentary top plan view taken on line 4—4 of FIG. 3 and illustrates a fixed conveyor and rails for the telescoping conveyor and the freight manipulator of the mixed freight handling system.

FIG. 5 is an enlarged fragmentary longitudinal sectional view taken on line 5—5 of FIG. 4 and illustrates details of the fixed conveyor of the system.

FIG. 6 is a fragmentary side elevational view of the telescoping conveyor and freight manipulator of the present invention shown in simultaneous presence within a truck trailer at a dock.

FIG. 7 is an enlarged fragmentary side elevational view of a track engaging wheel and anti-tipping rollers of the freight manipulator of the present invention.

FIG. 8 is an enlarged fragmentary transverse sectional view taken on line 8—8 of FIG. 7 and illustrates further details of a track engaging wheel and an anti-tipping roller of the freight manipulator.

FIG. 9 is an enlarged fragmentary rear end elevational view taken on line 9—9 of FIG. 6 and illustrates details of a drive wheel of the freight manipulator.

FIG. 11 is a fragmentary side elevational view of a base section, a lift section, and a head section of the telescoping conveyor illustrated in a lowered condition.

FIG. 12 is a view similar to FIG. 11 and illustrates the lift section and head section of the telescoping conveyor in a lifted condition.

FIG. 13 is a fragmentary top plan view of the head section of the telescoping conveyor with a portion broken away to illustrate details of a head section swinging mechanism.

FIG. 14 is a fragmentary view similar to FIG. 13 and illustrates the head section of the telescoping conveyor pivoted to the left, as viewed toward a front end thereof, and with the head section pivoted to the right diagrammatically illustrated in phantom lines.

FIG. 15 is an enlarged fragmentary top plan view of the base section of the telescoping conveyor with portions broken away to illustrate operational details thereof.

FIG. 16 is an enlarged fragmentary top plan view of the lift section of the telescoping conveyor with portions broken away to illustrate operational details thereof.

FIG. 17 is a greatly enlarged fragmentary top plan view illustrating details of a pivotal joint between the base section and the lift section of the telescoping conveyor.

FIG. 18 is an enlarged fragmentary side elevational view of a front end of the lift section and a rear end of the head section of the telescoping conveyor and illustrates details of a swinging pivotal joint between a pitch frame of the head section and a swing frame thereof.

FIG. 19 is a greatly enlarged fragmentary top plan view taken on line 19—19 of FIG. 18 and illustrates a pivotal joint between the lift section and the head section of the telescoping conveyor.

FIG. 20 is an enlarged fragmentary longitudinal sectional view taken on line 20—20 of FIG. 16 and illustrates internal operational details of the lift section of the telescoping conveyor.

FIG. 21 is an enlarged fragmentary longitudinal sectional view taken on line 21—21 of FIG. 15 and illustrates internal operational details of the base section of the telescoping conveyor.

FIG. 24 is a fragmentary top plan view of a boom of the freight manipulator shown in an extended condition with phantom views illustrating lateral shifting positions of a tool carriage thereof and with phantom views in a retracted condition of the boom illustrating right and left pivoting extremes of the tool carriage.

FIG. 25 is a side elevational view of the freight manipulator with a somewhat extended condition of the boom shown in phantom.

FIG. 26 is an enlarged fragmentary side elevational view of a chassis of the freight manipulator and illustrates details of reels for paying out and retracting hydraulic hoses supplying operational components of the manipulator.

FIG. 27 is a diagrammatic fragmentary longitudinal sectional view of the boom of the freight manipulator in a retracted condition and illustrates an internal hydraulic cylinder thereof for extending and retracting a forward section of the boom.

FIG. 28 is a diagrammatic fragmentary longitudinal sectional view in plan of the boom of the freight manipulator in a retracted condition and illustrates external hydraulic cylinders thereof for extending and retracting an intermediate section of the boom.

FIG. 29 is a greatly enlarged fragmentary transverse sectional view taken on line 29—29 of FIG. 28 and illustrates details of the boom of the freight manipulator.

FIG. 30 is an enlarged fragmentary side elevational view of the boom of the freight manipulator and illustrates details of a boom support bogie with portions broken away and with raised and lowered positions of the bogie illustrated fragmentarily in phantom.

FIG. 31 is a fragmentary transverse sectional view taken on line 31—31 of FIG. 30 and illustrates details of the boom support bogie of the freight manipulator.

FIG. 32 is a greatly enlarged fragmentary view similar to FIG. 31 and illustrates details of a wheel of the boom support bogie.

FIG. 33 is a somewhat enlarged fragmentary plan view of the tool support carriage of the freight manipulator with a shifted and pivoted condition of the carriage illustrated in phantom.

FIG. 34 is a somewhat enlarged fragmentary side elevational view of the tool support carriage of the freight manipulator with a tilted condition of a tool support tine illustrated fragmentarily in phantom.

FIG. 35 is a diagrammatic fragmentary longitudinal sectional view at a reduced scale and illustrates operational details of the lift cylinder mechanism for the tool support carriage.

FIG. 36 is an enlarged fragmentary transverse sectional view taken on line 36—36 of FIG. 6 and illustrates details of drive elements and connections thereof to drive wheels of the freight manipulator.

FIG. 37 is a diagrammatic perspective view illustrating a shift cylinder mechanism of the tool support carriage of the freight manipulator.

FIG. 38 is a greatly enlarged transverse sectional view taken on line 38—38 of FIG. 15 and illustrates details of a surface engaging wheel of the base section of the telescoping conveyor.

FIG. 39 is a diagrammatic fragmentary longitudinal sectional view at an enlarged scale of a modified embodiment of the head section of the telescoping conveyor with a declinable end portion.

FIG. 40 is a fragmentary perspective view of a second modified embodiment of the head section of the telescoping conveyor and illustrates a worker platform therefor in a deployed condition.

FIG. 41 is a fragmentary side elevational view of the second modified embodiment of the head section of the telescoping conveyor with the worker platform.

DETAILED DESCRIPTION OF THE INVENTION

Figure 10:
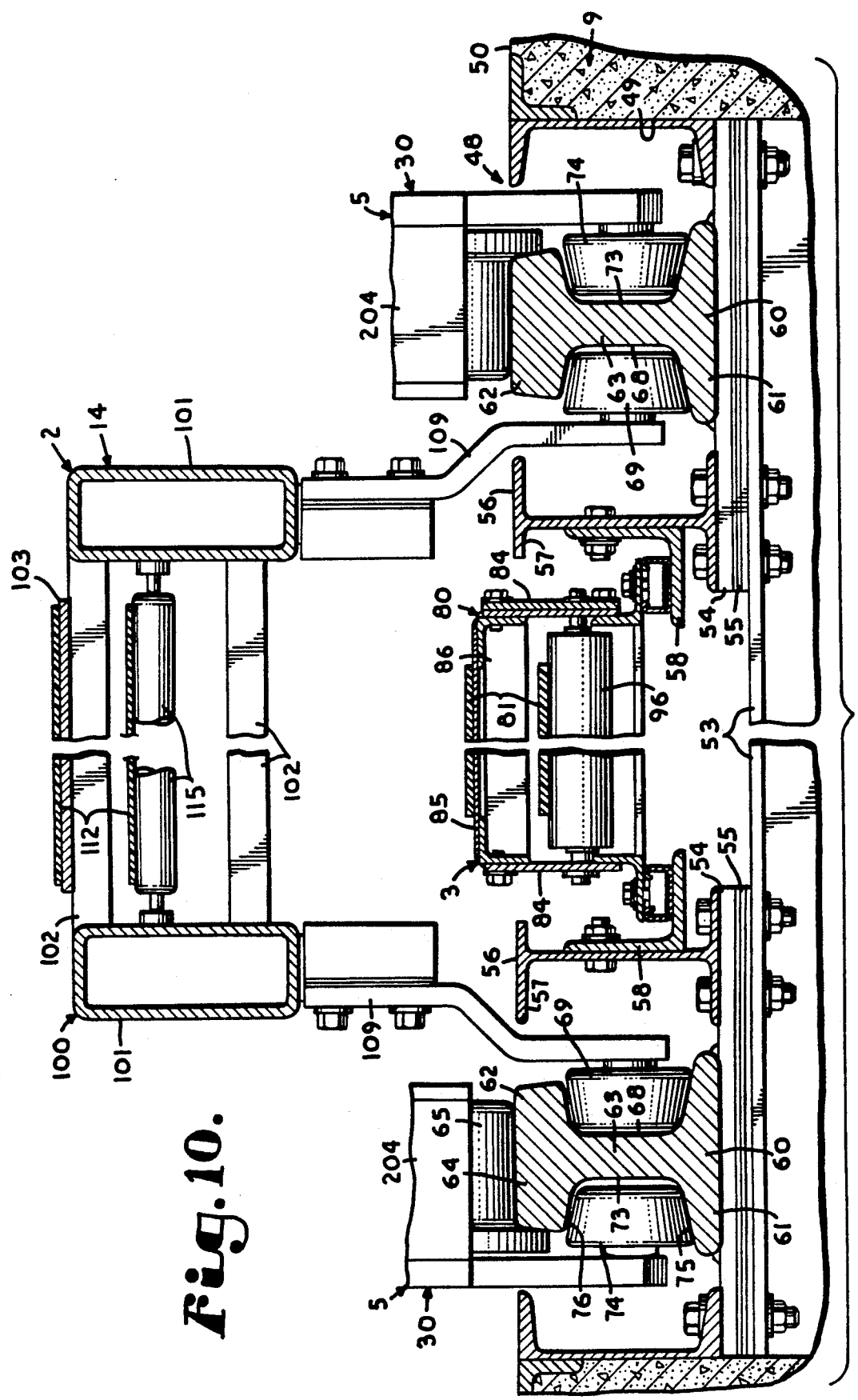
FIG. 10 is a greatly enlarged, fragmentary transverse sectional view taken on line 10—10 of FIG. 4 and illustrates details of support rails and guide tracks for the telescoping conveyor and the freight manipulator and details of the telescoping conveyor and fixed conveyor.
Figure 22:
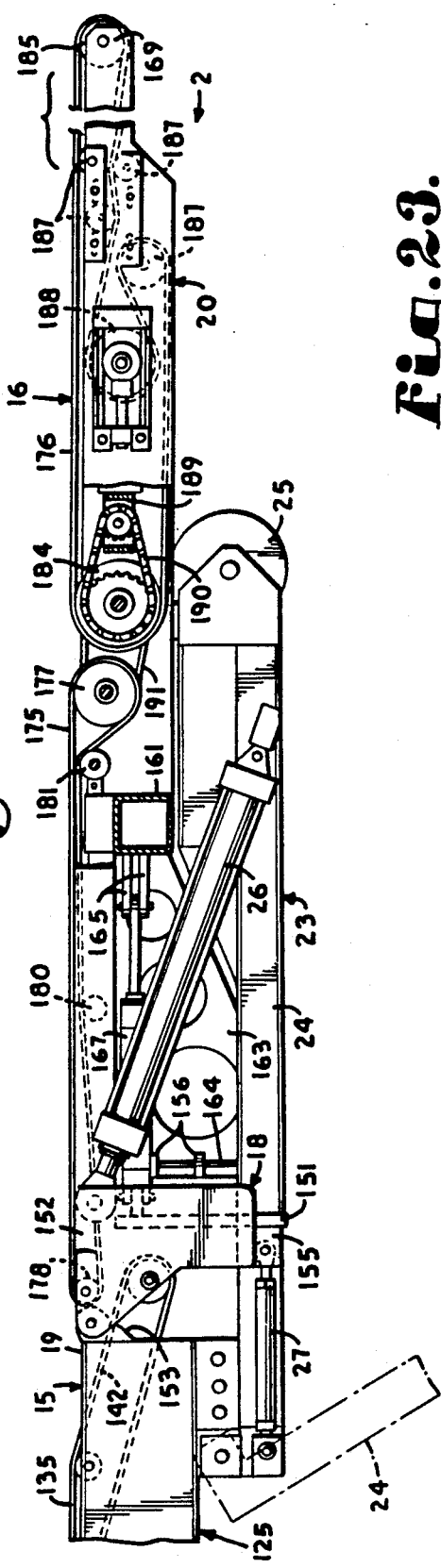
FIG. 22 is a further enlarged fragmentary side elevational view of the head section of the telescoping conveyor with portions broken away to illustrate internal details thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a mixed freight handling system embodying the present invention. The system 1 generally includes a telescoping or translation conveyor 2, overlapping and communicating articles 4 with a fixed conveyor 3, and a freight manipulator 5 which straddles the telescoping conveyor 2 and fixed conveyor 3 and which communicates freight 6 with a manipulator or freight conveyor 7. The telescoping conveyor 2 is translatable to extend into a truck trailer 8 parked at a dock 9 to receive hand liftable articles 4 to convey them to the fixed conveyor 3 for further handling. The freight manipulator 5 is translatable to engage manually nonliftable freight 6 in the trailer 8 to transfer it to the freight conveyor 7.

Referring to FIGS. 11 and 12, the extendible or telescoping conveyor 2 includes a rear base section 14, a middle lift section 15, and a front head section 16. The lift section 15 is pivotally connected to the base section 14, and the head section 16 is pivotally connected to the lift section 15, both for pivoting about respective axes transverse to a longitudinal extent of the conveyor 2. The head section 16 includes a rear pitch frame 18 (FIG. 18) which is pivotally connected to a front end 19 of the lift section 15 to allow a pitching or inclined relationship between the head and lift sections and a front swing frame 20 pivotally connected to the pitch frame 18 for pivoting about a vertical axis, that is, for swing movements by the head section 16.

A conveyor lift strut assembly 23 (FIGS. 11 and 12) is connected t the lift section 15 and the head section 16 and is operable to raise the head section 16 to facilitate the manual placement of stacked articles 6 thereon. The assembly 23 includes a pair of lift struts 24 pivotally connected to the front end 19 of the lift section 15, surface engaging wheels 25 journaled at outer ends of the struts 24, and a pair of hydraulic lift cylinders 26 pivotally connected between the struts 24 and the pitch frame 18 of the head section 16. Leveling links 27 are pivotally connected between the struts 24 and the pitch frame 18. When the cylinders 26 are extended, the struts 24 are pivoted downwardly as the lift section 15 is inclined. The links 27 pivot the head section 16 downwardly in such a manner that it remains substantially horizontal when lifted.

Referring to FIGS. 1, 3, and 6, the freight manipulator 5 generally includes a mobile chassis 30, an extendible boom or boom assembly 31 mounted on the chassis 30, a boom support bogie 32 mounted at a front end 33 of the boom 31, a tool support carriage assembly 34 mounted at the front end 33 of the boom 31, and tool receiving tines or forks 35 mounted on the tool carriage assembly 34. The boom 31 includes a rear boom section 38 mounted through the chassis 30, a middle boom section 39 sleeved within the rear boom section 38, and a front boom section 40 sleeved within the middle boom section 39. The boom assembly 31 has a length to allow the forks 35 to reach freight 6 at a front end 42 of a trailer 8 of standard length when the chassis 30 is positioned at its forwardmost position near the edge 44 of the dock 9 (FIGS. 3 and 4).

FIGS. 4 and 10 illustrate a guide means or guide assembly 48 for the telescoping conveyor 2 and the freight manipulator 5 of the system 1. Referring to FIG.

10, an elongated guide trench 49 is formed into surface 50 of the dock 9 to receive the guide assembly 48. A plurality of cross beams or ties 53 are positioned across the trench 49 at spaced locations therealong to support the guide assembly 48. Each tie 53 is an I-beam and has a pair of track pads 54 positioned thereon with sound insulation material 55 sandwiched therebetween. A pair of elongated parallel conveyor support rails 56 are attached to the ties 53 through the pads 54 and material 55 along the length of the trench 49. The rails 56 are illustrated as I-beams and statically support the fixed conveyor 3 while dynamically supporting the telescoping conveyor 2 on top flanges 57. Brackets 58 formed of angle stock are attached to webs the rails 56 along their lengths. The fixed conveyor 3 is mounted on inwardly directed flanges of the brackets 58.

Parallel main rails 60 are mounted on the cross ties 53 through the pads 54 and insulation material 55 outside of the conveyor support rails 56. The main rails 60 support and guide the freight manipulator 5 and guide the telescoping conveyor 2. The rails 60 are similar in cross section to conventional railroad rails and each includes a base flange 61 and a top flange 62 which are connected by a web 63. Top surfaces 64 of the top flanges 62 support wheels 65 and drive wheels 66 of the freight manipulator 5 (FIG. 6). The main rails 60 have inwardly open channels which form conveyor guide tracks 68 for depending guide rollers 69 of the base section 14 of the telescoping conveyor 2. The guide rollers 69 normally engage upper surfaces 75 of the base flanges 61.

Outwardly open channels of the rails 60 form safety tracks 73 for anti-tipping or stabilizing rollers 74 associated with the wheels 65 of the freight manipulator 5 to resist forward tipping of the manipulator chassis 30 caused by moments on the front end 34 of the boom 31, such as might be caused by extension of the tool carriage 34 into a trailer 8 with a bed 77 considerably lower than the dock surface 50. The anti-tipping rollers 74 normally ride loosely on upper surfaces 75 of the base flanges 61, with weight of the manipulator chassis 30 borne by the upper surfaces 64 of the rails 60. Should a chassis tipping moment occur, the rollers 74 engage lower surfaces 76 of the top flanges 62 to resist such tipping.

FIGS. 5 and 10 illustrate structural and operating details of the fixed conveyor 3. The conveyor 3 includes a fixed conveyor frame 80 which supports a fixed conveyor belt 81 and a fixed conveyor belt drive mechanism 82 which drives the belt 81. The frame 80 includes elongated side members 84 connected by a belt slide sheet 85 and cross members 86. The frame 80 is supported along the trench 49 by the brackets 58 on the conveyor support rails 56. The drive mechanism 82 includes a drive frame 88 attached to the fixed conveyor frame 80 and depending therefrom into a fixed conveyor drive pit 89 formed in the dock 9 and communicating with the trench 49. The drive mechanism 82 includes a fixed conveyor belt motor 90 mounted on the drive frame 88 and connected by an endless sprocket chain 91 to a belt drive roller 92. An upper flight of the fixed conveyor belt 81 extends between front and rear end rollers 94 and 95 and is supported by the slide sheet 85. Within the frame 80, the belt 81 is threaded over idler rollers 96 and about the tension rollers 97 and the drive roller 92.

Referring to FIGS. 10, 11, 15, and 21, the base section 14 of the telescoping conveyor 2 includes a base section frame 100 formed of side members 101 connected by cross members 102 which additionally support a base section conveyor belt slide sheet 103. The base section 14 is supported on the conveyor support rails 56 by wheels 104 mounted on the side members 101 (FIGS. 11 and 38). At least one of the wheels is a drive wheel 105 drivingly engaged with a base section translation motor 106 through a drive belt 107. The motor 106, belt 107, and drive wheel 105 form a translation mechanism or motor means 108 for the telescoping conveyor 2. The base section 14, and the telescoping conveyor 2 in general, are guided by engagement of the guide rollers 69 with the conveyor guide tracks 68 of the main rails 60. The guide rollers 69 are journaled on depending legs 109 which are attached to the side members 101. An upper flight of a base section conveyor belt 112 extends between front and rear rollers 113 and 114 and is supported by the slide sheet 103. The belt 112 is supported within the base section frame 100 by idler rollers 115 and at least one tension roller 116. In the illustrated base section 14, the rear end roller 114 is a drive roller and is drivingly engaged with a conveyor belt drive motor 117 through and endless sprocket chain 118. Preferably, a rear end 119 of the base section frame 100 is provided with means to ease the transition of articles 4 therefrom to the fixed conveyor belt 81. As illustrated in FIGS. 1 and 3, the base section 14 may be provided with an article ramp 120 down which articles 4 slide from the base section belt 112 to the fixed conveyor belt 81.

Figures 15, 16, 17:
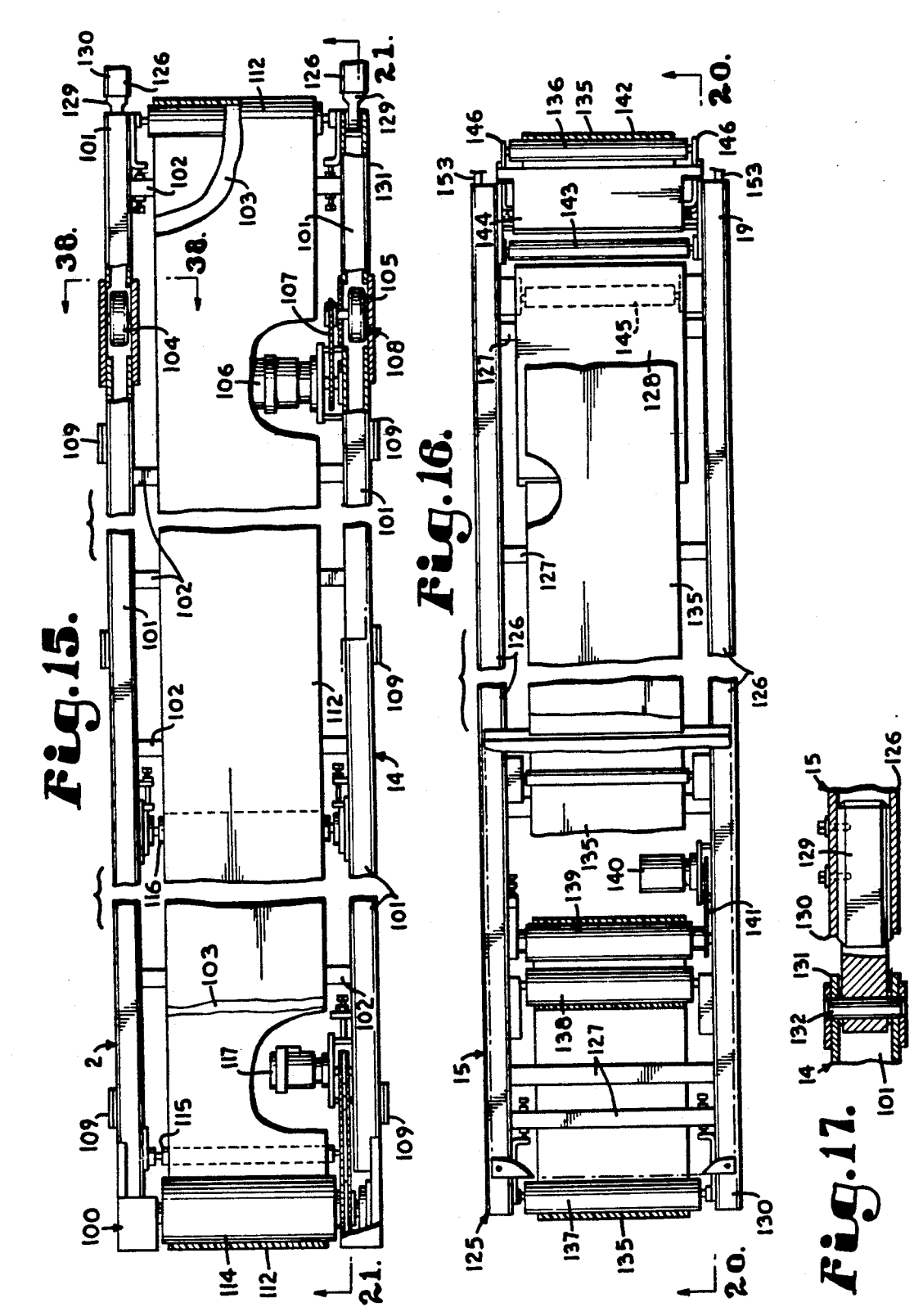

FIGS. 12, 16, and 20 illustrate details of the lift section 15 of the telescoping conveyor 2. The lift section 15 includes a lift section frame 125 formed of a pair of elongated parallel side members 126 connected by cross members 127 which support a lift section conveyor belt slide sheet 128. The lift section 15 does not have wheels thereon which directly engage the rails 56 but is supported by its connection to the base section 14, the head section 16, and the lift strut assembly 23 which rides on the rails 56. Referring to FIG. 17, the side members 126 of the lift section 15 have pivot ears 129 which extend therefrom at a rear end 130 of the lift section frame 125 and are received in the side members 101 at a front end 131 of the base section 14. Aligned pivot pins 132 extend through the respective front ends of the base section side members 101 and the pivot ears 129 to form a transverse pivot axis between the base section frame 100 and the lift section frame 125. The pivotal joint between the base section 14 and lift section 15 is adapted to allow inclining of the lift section frame 125 upwardly relative to the horizontal base section frame 100. The front end 19 of the lift section frame 125 is pivotally connected to the head section 16, as will be detailed below, whereby the lift section 15 is suspended between the base section 14 and the lift strut assembly 23 when inclined.

An upper flight of a lift section conveyor belt 135 extends between front and rear end rollers 136 and 137 and is supported therebetween by the slide sheet 128. Within the lift section frame 125, the belt 135 passes around a tension roller 138 and a drive roller 139. The belt 135 is propelled by a motor 140 engaged through a drive belt 141 with the drive roller 139. A front end portion 142 of the belt 135 is declined, for reasons described below. The front portion 142 passes around an upper direction changing roller 143, is supported by a declined slide sheet 144, passes around the front end roller 136, and passes about a lower direction changing idler roller 145. The front end roller 136 is supported on arms 146 which extend forward of the front end 19 of the lift section frame 125. Depending ears 147 (FIG. 20) are provided on lower sides of the side members 126 at the front end 19 and have the struts 24 of the lift strut assembly 23 pivotally connected thereto.

Figure 23:
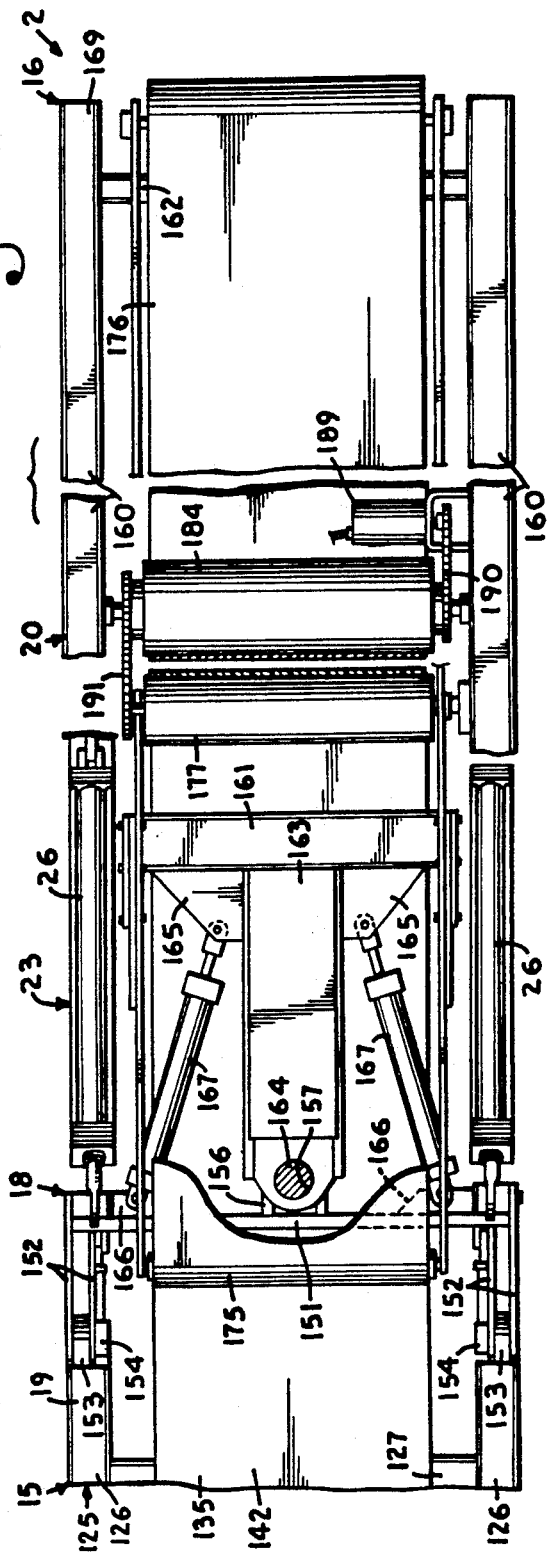
FIG. 23 is a fragmentary top plan view of the head section of the telescoping conveyor at a scale similar to FIG. 22, with portions broken away to illustrate details of the swinging mechanism and belt drive mechanisms thereof.

FIGS. 11-14, 18, 19, 22, and 23 illustrate details of the head section 16 of the telescoping conveyor 2. The head section 16 includes the pitch frame 18, which is pivotally connected to the front end 19 of the lift frame 15 and has the lift strut assembly 23 pivotally connected thereto, and the swing frame 20 which is pivotally connected to the pitch frame 18 by a swing or swivel joint 150 (FIG. 18) for swinging of the swing frame 20 about a vertical axis. The pitch frame 18 includes a cross plate 151 with rearwardly extending double side ears 152 attached thereto. Referring to FIGS. 19 and 23, the side ears 152 are pivotally connected to a forwardly extending ear 153 on the front end 19 of the lift section frame 125. Aligned transverse pivot pins 154 extend through the ears 152 and 153 to provide for pitching or pivoting of the pitch frame 18 about a transverse axis in a downward direction relative to the lift section 15 (clockwise as viewed in FIG. 12).

Rearwardly extending lugs 155 are positioned at a lower end of the cross plate 151 at the outer edges thereof and have the leveling links 27 pivotally connected thereto. The upper ends of the lift cylinders 26 are pivotally connected to a front upper side of the cross plate 151. Along a vertical center line of the cross plate 151, forwardly extending swing joint ears 156 are provided. The ears 156 have vertically aligned apertures 157 therethrough.

The swing frame 20 includes side members 160 connected by a main cross member 161 (FIGS. 18 and 23) and additional cross members 162. A central spinal beam 163 extends rearwardly from the main cross member 161 and supports a vertical swing joint shaft 164 which is journaled through the apertures 157 of the swing joint ears 156. On each side of the spine 163, sets of front pivot webs 165 are attached to the spine 163 and the main cross member 161, and rear pivot webs 166 are attached to the front side of the cross plate 151. Right and left swing cylinders 167 are pivotally connected between the respective sets of front and rear pivot webs 165 and 166. The swing cylinders 167 are extended and retracted in a coordinated manner to pivot the swing frame 20 about the swing shaft 164. It is desirable to limit the degree of swing of the frame 20 to avoid collisions between the swing frame 20 and the lift cylinders 26 and between a front end 169 of the swing frame 20 and the side walls 170 (FIG. 1) of the trailer 8. A limit switch assembly 171 (FIG. 13) is positioned on the spine 163, with portions also mounted on the cross plate 151, and connected to controls (not shown) for the swing cylinders 167. FIG. 14 diagrammatically illustrates the maximum degree of swing of the swing frame 20 relative to the pitch frame 18 of the head section 16.

The illustrated head section 16 is provided with a rear conveyor belt 175 and a front conveyor belt 176. The rear belt 175 extends between a front drive roller 177 and a rear idler roller 178 over a slide sheet 179 (FIG. 18). Beneath the slide sheet 179, the rear belt 175 is supported by additional idler rollers 180 and a tension roller 181. The front belt 176 extends between a rear drive roller 184 and a front idler roller 185 over a slide sheet 186 (FIG. 18). The front belt 176 is supported by and passes about additional idler rollers 187 and at least one tension roller 188. The front and rear belts 176 and 175 are propelled by a common motor 189 which is engaged with the rear drive roller of the front belt 176 through a belt or sprocket chain 190. On the opposite side of the swing frame 20 from the motor 189, a belt or sprocket chain 191 is engaged between the drive roller 184 of the front belt 176 and the drive roller 177 of the rear belt 175, whereby the belts 175 and 176 are driven in unison.

As shown particularly in FIG. 18, the rear end idler roller 178 of the rear belt 175 is spaced above the declined section 142 of the lift section belt 135. The declination of the belt section 142 and the underlapping of it in relation to the end idler roller 178 accommodates the swinging of roller 178 thereabove while maintaining an overlapping relationship of the belt 175 with the front section 142 such that an article 4 can be passed from the belt 175 of the head section 16 to the belt 135 of the lift section 15. The conveyor belts 112, 135, 175, and 176 form an article support surface 182 (FIG. 1) which is capable of simultaneously supporting a moving succession of articles 4.

FIGS. 6, and 24-37 illustrate details of the freight manipulator 5. Referring to FIGS. 25 and 36, the manipulator chassis 30 is formed of side members 200 connected by cross members 201 and end panels 202 to form a rigid chassis frame 203. Lower portions of the side members 200 have legs 204 attached thereto on which the wheels 65 and drive wheels 66 are journaled. The wheels 65 and 66 are rimmed wheels, similar to railroad type wheels, such that the chassis is essentially self guiding. Boom support brackets 205 are mounted above the cross members 201 and have the rear boom section 38 mounted therethrough. The chassis is self propelled by means of a chassis translation motor 208 (FIG. 6) engaged with the drive wheels 66 through sprocket chains 209. Drive is transferred from the motor 208 to both drive wheels 66 through a clutch mechanism 210 and a drive shaft 211 (FIG. 36) mounted across the chassis frame 203 in pillow blocks 212 positioned on brackets 213. The shaft 211 has sprockets thereon which engage the chains 209. As illustrated in FIG. 36, a lower edge 214 of the end panels 202 and inner surfaces 215 of the side members 200 form an opening or tunnel 216 through the chassis 30 through which articles 4 on the telescoping conveyor 2 or 3 can pass. All operating components of the chassis 30 are positioned outside of the boundaries of the tunnel 216 to avoid interference with articles 4 on the conveyors 2 and 3.

Referring particularly to FIGS. 27 and 28, the rear boom section 38 is supported by and extends through the chassis 30. The rear boom section 38 has a front roller 220 on which the middle boom section 39 is supported and rides during extension and retraction of the boom 31. The middle boom section 39 has a rear roller 221 which bears against and rides along an under side of an upper wall of the rear boom section 38. The front boom section 40 is supported within the middle boom section 39 on a front roller 222 and by engagement of a rear roller 223 mounted at a rear end of the front section 40 with an under side of an upper wall of the middle boom section 39. A rear portion 225 of the middle boom section 39 extends through a rear end panel 202 of the chassis 30.

The middle boom section 39 is extended from and retracted into the rear boom section 38 by operation of a pair of middle section hydraulic cylinders 227 having rear ends thereof connected to the rear boom section 38. The cylinders 227 are a type of hydraulic cylinders in which a rod 228 thereof extends entirely through the cylinder and out each of the ends thereof. A piston (not shown) is positioned on the rod 228 at a midpoint thereof and seals between the rod 228 and cylinder 227. A front end 229 of each of the rods 228 is connected to the front end of the middle boom section 39, and a rear end 230 of the rod 228 extends through the rear panel 202 of the chassis frame 203. When the middle boom section 39 is to be extended, the front ends 229 of the rods 228 are extended out of the cylinders 227 while the rear ends 230 are retracted into the cylinders 227.

The front boom section 40 is extended from and retracted into the middle boom section 39 by operation of a front section hydraulic cylinder 232 similar to the middle cylinders 227. The front cylinder 232 has a rod 233 extending therethrough and having a rear end 234 connected to a rear end of the middle boom section 39, and a front end 235 of the rod 233 extends out of a front end of the cylinder 232. The front cylinder 232 is connected to a rear end of the front boom section 40 by pins 236. When the front boom section 40 is to be extended, the rear end 234 of the rod 233 is extended out the rear end of the cylinder 232 while the front end 235 is retracted thereinto to urge the front boom section 40 forward.

Although the boom assembly 31 is described and illustrated as having three telescoping sections, it could alternatively have a greater or lesser number of sections or be of fixed length. While the extendible boom 31 has greater flexibility of use than a fixed boom assembly and is more compact when retracted, costs can be reduced somewhat with a boom of fixed length. A fixed length boom would be useful particularly at a dock at which only short trailers, known as "pup" trailers, are to be loaded and unloaded. With a fixed length boom, extension of the tools 35 into the trailer 8 is accomplished entirely by operation of the chassis motor 206.

FIGS. 30-32 illustrate details of the boom support bogie assembly 32. The bogie 32 includes a pair of L-shaped legs 240 connected by a cross brace 241 and pivotally connected to the front end 33 of the boom assembly 31 by a bogie pivot shaft 242. Bogie wheels 243 are journaled at lower ends of the legs 240 and ride on the main support rails 60 on the dock 9 and on the bed 77 of the trailer 8 when the boom 31 is extended thereinto. The bogie assembly 32 is made pivotal to accommodate level differences between the surface 50 of the dock 9 and the bed 77 of the trailer 8. A hydraulic cylinder 244 is connected between a lower side of the front end of the front boom section 40 and the cross brace 241. The cylinder 244 is extended or retracted to respectively lower or raise the level of the wheels 243 with respect to the front end 33 of the boom 31. A lower side 245 of the cross brace 241 and inner sides 246 of the legs 240 define a bogie tunnel 247 which is sized similar to and aligned with the tunnel 216 of the chassis 30 and is provided for the same purpose. The bogie assembly 32 supports the weight of the front end 33 of boom assembly 31, the tool carriage assembly 34, and any freight 6 carried thereby.

FIGS. 33-35 and 37 illustrate details of the tool support carriage assembly 34. The carriage assembly 34 includes a tool carriage articulation system 250 by which the freight engagement tools 35 are moved with respect to the front end 33 of the boom assembly 31. The articulation system 250 generally includes a transverse tool carriage shift mechanism 251, a tool carriage pivot mechanism 252, and a tool carriage lift mechanism 253.

The tool carriage shift mechanism 251 includes a shift frame 255 mounted on the front end 33 of the boom assembly 31 and including a transversely extending carriage shift support beam 256 attached at a lower region of the front end 33. The beam 256 is illustrated as an I-beam with depending ribs from a lower flange thereof forming a lower shift track 257. An upper shift track 258 is formed by an upwardly open channel shaped member extending across the front end 33 parallel to the lower track 257. A tool shift carriage 259 rides on the lower track 257 and upper track 258 and, additionally, on a middle shift track 260 formed by the upper surface of the lower flange of the support beam 256. The shift carriage 259 includes a lower plate 261 which supports a set of lower rollers 262 which ride in the lower shift track 257 and an upper plate 263 which supports a set of upper rollers 264 which ride in the upper track 258. A middle plate 265 supports middle rollers 266 which ride on the middle track 260. The middle track 260 bears most of the weight of the shift carriage 259, while the upper and lower tracks 258 and 257 provide static and dynamic cantilever support to the shift carriage 259.

FIG. 37 diagrammatically illustrates the operation of a shift cylinder 269 which moves the shift carriage relative to the shift frame 255. The cylinder 269 has a rod 270 extending entirely therethrough with ends of the rod 270 being oriented parallel to the shift tracks 257, 258, and 260 and attached to the shift frame 255 whereby the cylinder 269 is translatable along the rod 270. The cylinder 269 has front and rear sets of right and left shift pulleys, 271 and 272 respectively, journaled thereon. The pulleys 271 and 272 have respective right and left shift cables 273 and 274 passing therearound with one end attached to the shift frame 255 and the other end attached to a shift plate 275 attached to the shift carriage 259. The right and left cables 273 and 274 ar wrapped in opposite directions about their respective pulleys 271 and 272. The purpose of the arrangement illustrated in FIG. 37 is to double the amount of translation of the shift carriage 259 for a given length of stroke of the shift cylinder 269. Thus, when the cylinder 269 is translated a given distance to the left, the arrangement of the left shift pulleys 272 and cables 274 cause the shift carriage 259 to shift to the left a distance twice the length of movement of the shift cylinder 269.

The shift carriage 259 has a tool pivot carriage or frame 280 pivotally connected thereto at an outer end thereof for pivoting about a vertical axis. The pivot carriage 280 has upper and lower pivot shaft support plates 281 and 282 respectively extending rearwardly therefrom which form cross members for the tool pivot carriage 280. The plates 281 and 282 support a tool pivot shaft 283 which passes through upper and lower pivot bearings 284 and 285 at the outer end of the tool shift carriage 259. Left and right pivot cylinders 286 and 287 are connected to a rear end of the shift carriage 259 and have respective rods 288 and 289 connected to opposite ends of a pair of sprocket chains 290 which engage sprockets on the pivot shaft 283. The cylinders 286 and 287 are operated in cooperation to pivot the pivot carriage 280 to the left and right. As shown in FIG. 24, the pivot carriage 280 can be pivoted through 180 degrees from left to right.

The tool carriage lift mechanism 253 is a two stage lift arrangement. Referring to FIGS. 33-35, the pivot carriage 280 has a pair of rails 295 connected to the upper and lower cross members 281 and 282 which form inwardly open fixed tracks. An intermediate lift carriage 296 has intermediate rollers 297 thereon which ride in the fixed lift tracks 295. The intermediate carriage 296 is connected by an intermediate lift cylinder 298 to the upper plate 281 of the pivot carriage 280. The intermediate carriage 296 has a tool lift cylinder 299 connected thereto which is also connected to a tool support carriage 300 on which the forks or tines 35 are mounted. As shown in FIGS. 33 and 35, a piston rod 303 of the tool lift cylinder 299 has a pair of pulleys 304 positioned at an end thereof. Cables 305 are connected to the intermediate lift carriage 296, pass over the pulleys 304, and connect to the tool support carriage 300. When the cylinder 299 is extended a given stroke length, the tool support carriage 300 is lifted by a distance double the stroke length in a manner similar to that illustrated in FIG. 37 for the connection of the shift cylinder 269 to the shift carriage 259.

When the intermediate lift cylinder 298 and the tool lift cylinder 299 are both retracted, the tool support carriage 300 is in such a position that the tools 35 are spaced off the surface 50 of the dock 9. In such a position, all portions of the tool support carriage assembly 34 are positioned above the telescoping conveyor 2 and the fixed conveyor 3 to avoid interference with articles 4 travelling therealong. When it is desired to engage freight 6 at dock level or on the bed 77 of the trailer 8, the intermediate lift cylinder 298 is extended to lower the intermediate carriage 296 to dock level. The tool support carriage 300 is supported on the carriage 296 and is, thus, lowered therewith as are the tools 35. The intermediate cylinder 298 is retracted to lift the freight 6 for transfer thereof. If a load of freight 6 is stacked on another one, the tools 35 may be raised from their normal positions to reach the freight by extending the tool lift cylinder 299 to raise the tool support carriage 300 relative to the intermediate lift carriage 296.

The tools or tines 35 are pivotally mounted on a tool support shaft 306 extending across the tool support carriage 300. Lower ends of the tools 35 are engaged by tool tilt cylinders 307 which are operable to tilt the tools 35 upwardly and downwardly to a slight degree to facilitate engagement and disengagement with the freight 6.

The articulation system 250 allows great flexibility in positioning the tools 35 to engage freight 6 in the trailer 8 and to disengage it onto the freight conveyor 7. The shift mechanism 251 allows freight 6 positioned at the side walls 170 of the trailer 8 to be engaged and lifted. Additionally the shift mechanism 251 cooperates with the pivot mechanism 252 to allow freight 6 to be turned and deposited onto the freight conveyor 7. The tilting capability of the tools 35 allows freight 6 to be carried more securely by tilting the tools upwardly a slight amount while downward tilting of the tools facilitates the withdrawal of the tools from the freight.

Referring to FIGS. 6 and 26, the freight manipulator 5 only requires external electrical power for operation. An electrically driven hydraulic pump 308 and hydraulic reservoir 309 provide hydraulic pressure to drive the hydraulic motors and cylinders on the manipulator 5. The manipulator chassis translation motor 206, the boom extension and retraction cylinders 227 and 233, the shift cylinder 269, the pivot cylinders 286 and 287, the lift cylinders 298 and 299, and the tilt cylinders 307 are all driven by fluid from the hydraulic pump 308 as controlled by a manipulator computer 310 by way of a system of hydraulic valves 311.

Electrical power for the pump 308 is communicated to the manipulator 5 by a power rail 312 (FIGS. 1 and 2) supported above the dock 9. Although not illustrated in detail, the power rail 312 has a plurality of bare power conductors extending therealong which are contacted by shoes on a trolley 313 which is mechanically connected to a collector arm 314 on the manipulator chassis 30. The contact shoes are connected to conductors of a power cable which supplies electrical power to the hydraulic pump 308. The trolley 313 is dragged along the power rail 312 as the manipulator 5 is translated along the tracks 60. Additionally, a communication cable 315 is supported by the power rail 312. The communication cable 315 is festooned along the lower side of the rail 312, that is, looped through hangers 316 which are slid along the rail 312 as the manipulator 5 is translated. In FIG. 1 only one power rail 312 is illustrated for graphic convenience. However, each freight manipulator 5 has a power rail 312 associated therewith.

Referring to FIG. 26, the freight manipulator 5 is provided with a take up mechanism 320 for paying out and taking up hydraulic hoses leading to the hydraulic cylinders which are moved when the boom assembly 31 is extended. The mechanism 320 includes a take up bracket 321 mounted on the chassis frame 203 and has a plurality of hose reels 322 rotatably mounted thereon. The hoses 323 supplying the movable hydraulic cylinders are wrapped onto the reels 322. Supply hoses (not shown) from the hydraulic pump 308 are connected by rotating connections (not shown) in the centers of the reels 322. As the boom assembly 31 is extended, the reels 322 rotate to pay out the hoses 323. The reels 322 are preferably spring loaded so that they rotate in an opposite direction to take u the hoses 322 as the boom 31 is retracted.

The telescoping conveyor translation and lift motors are hydraulically operated and pay out and retract hoses therefor in a manner similar to the take up system 320. Referring to FIG. 6, a plurality of hoses reels 324 are mounted in the pit 89 in which the drive mechanism 82 for the fixed conveyor 3 is mounted. Hydraulic hoses 325 are wrapped on the reels 324 and are connected to a fitting (not shown) in the base section 14 of the telescoping conveyor 2. As the conveyor 2 is translated toward the trailer 8, the reels 324 pay out the hoses 325 which slip along the conveyor support rails 56 behind the base section 14. The reels 324 are spring loaded so that as the conveyor 2 is retracted from the trailer 8, the hoses 325 are taken up by the reels 324. The telescoping conveyor 2 also has a communication cable not shown) connected to and controlling hydraulic valves (not shown) which, in turn, control the hydraulic motors and cylinders within the conveyor 2. The communication cable is payed out and taken up in the same manner as the hydraulic hoses 325.

The tool support carriage 300 is preferably adapted for interchangeably attaching a variety of freight engaging tools to the tines 35 for engaging and unloading various types of freight 6. As illustrated in FIG. 1, a tool rack 327 has a variety of types of tools positioned thereon, such as a jib boom (not shown), a set of drum clamps 328, fork extensions 329, and the like. A manipulator 5 illustrated near the rack 327 has a rug pole 330 mounted thereon. Preferably, the special tools 328-330 are receivable onto the tool support carriage 300 by insertion of the tines 35 thereinto. The attachment of the tools 328-330 is facilitated particularly by the shift mechanism 251 and the tilt cylinders 307.

The freight manipulator 5 is adapted for execution of a number of functions automatically. Such functions could include the retraction of the boom 31 and translation of manipulator 5 and coordinated operation of the articulation system 250 to place a load of freight 6 onto the freight conveyor 7 after engaging such a load, and thereafter withdrawing to a parking position or returning to the trailer 8 for another load. Additionally, the interchange of tools could be automated. Such automated functions are made possible by programming of the manipulator control computer 310 to sequence the hydraulic valves 311 in the proper order and for the necessary duration for the desired function.

FIG. 39 illustrates a modified embodiment of a head section 335 for the telescoping conveyor 2. In the modified head section 335, a front end portion of a conveyor belt 336 thereof is declinable. The belt 336 passes about upper and lower direction rollers 337 and 338 to an end idler roller 339. The end roller 339 is supported between end arms 340 which are pivotally connected to side members 341 of the head section 335. An extendible member (not shown) may be connected between the arms 340 and the side members 341 for selectively declining and leveling the arms 340. The modified head section 335 is particularly useful in receiving articles 4 which are positioned on the bed 77 of a trailer 8 to reduce the amount of lift necessary to place the articles onto the head section 335. In other respects, the head section 335 is similar to the head section 16 described above.

FIGS. 40 and 41 illustrate a second modified embodiment of a head section 345 which is provided with a collapsible worker platform 346 assembly. A platform member 347 has rearwardly extending arms 348 which are pivotally connected at front ends thereof to hanger members 349 which are pivotally connected to a head section frame 350. Rear ends of the arms 348 are pivotally connected to control levers 351 which are also pivotally connected to the side members 350 to form a parallelogram linkage arrangement. Cross braces may interconnect the control levers 351 and the arms 348. An extendible cylinder 352 is pivotally connected between one of the control levers 351 and one of the side members 350. Extension of the cylinder 352 deploys the platform assembly 346 while retraction collapses the assembly 346 beneath the head section 345. The worker platform assembly 346 is useful for lifting a worker to reach articles 4 stacked to a height would otherwise be difficult to transfer onto the head section 345. In other respects, the head section 345 is substantially similar to the head section 16 described above.

It is to be understood that while certain forms of the present invention have been illustrated and described herein, it is not to be limited to the specific forms or arrangement of parts described and shown.

What is claimed and desired to be secured by Letters Patent is as follows:

1. An article handling conveyor system for transferring articles between spaced apart first and second locations, said second location being within an elongated article transferring vehicle and said first location being external to said vehicle, said system comprising:
   (a) an elongated fixed conveyor positioned at said first location;
   (b) an elongated movable conveyor positioned at said first location in a straddled vertically spaced parallel relation to said fixed conveyor to communicate articles therewith and movable between a retracted condition at said first location and an extended condition invading said second location while maintaining a portion of said movable conveyor in said straddled vertically spaced parallel relation to said fixed conveyor;
   (c) each of said conveyors including means forming respective support surfaces capable of supporting respective moving successions of articles;
   (d) said movable conveyor including a substantially horizontal base section; and
   (e) said movable conveyor including a lift section pivotally connected to said base section at an end thereof toward said second location, said lift section being selectively inclined upwardly in said extended condition of said movable conveyor.

2. A system as set forth in claim 1 wherein said movable conveyor includes:
   (a) a head section pivotally connected to said lift section and lifted when said lift section is inclined, said head section being interrelated to said lift section in such a manner that said head section is maintained substantially horizontal when said lift section is inclined.

3. A system as set forth in claim 2 wherein:
   (a) said head section is selectively pivotable about a vertical axis.

4. A system as set forth in claim 2 and including:
   (a) conveyor lift means pivotally connected to an end of said lift section toward said other location and to said head section, said carriage means being operable to incline said lift section of said movable conveyor.

5. A system as set forth in claim 2 and including:
   (a) a lift carriage pivotally connected to said lift section and extending beneath said head section;
   (b) a linear lift motor pivotally connected between said lift carriage and said head section; and
   (c) a leveling link pivotally connected between said lift carriage and said head section and operative to maintain said head section substantially horizontal as said lift motor is operated to incline said lift section.

6. A system as set forth in claim 2 and including:
   (a) a worker platform connected to said head section at an end thereof toward said other location to support a worker when said base section is lifted.

7. A system as set forth in claim 6 wherein:
   (a) said platform is collapsible under said base section when said base section is not lifted.

8. A system as set forth in claim 1 and including:
   (a) conveyor guide means extending from said first location part way to said second location and having said movable conveyor engaged therewith, at least part of said movable conveyor engaging said guide means in said extended condition of said movable conveyor.

9. A system as set forth in claim 1 and including:
   (a) a conveyor support rail extending from said first location part way to said second location and having said movable conveyor supported thereon, at least part of said movable conveyor being supported by said rail in said extended condition of said movable conveyor.

10. A system as set forth in claim 1 and including:
    (a) a pair of conveyor support rails extending from said first location part way to said second location and having said movable conveyor supported thereon;

(b) a pair conveyor guide tracks extending parallel to said rails from said first location part way to said second location and having said movable conveyor engaged therewith; and (c) at least part of said movable conveyor being supported by said rails and engaging said tracks in said extended condition of said movable conveyor.

11. A method for transferring articles between spaced apart first and second locations, said second location being within an elongated article transferring vehicle and said first location being external to said vehicle, said system comprising the steps of:

(a) positioning an elongated fixed conveyor at said first location, said fixed conveyor including means forming a first support surface capable of simultaneously supporting a moving succession of articles;

(b) positioning an elongated movable conveyor at said first location in a straddled vertically spaced parallel relation to said fixed conveyor to communicate articles with said fixed conveyor, said movable conveyor including means forming a second support surface capable of simultaneously supporting a moving succession of articles, and said movable conveyor including a base section and a lift section which is raisable with respect to said base section;

(c) moving said movable conveyor between a retracted condition at said first location and an extended condition invading said second location while maintaining said movable conveyor in said straddled vertically spaced parallel relation to said fixed conveyor;

(d) selectively raising said lift section with respect to said base section when said movable conveyor is in said extended condition;

(e) communicating an article between said head section and said base section; and (f) conveying said article along said movable conveyor in said extended condition thereof.

12. A method as set forth in claim 11 wherein an inclinable lift section connects said head section to said base section and including the steps of:

(a) inclining said lift section to raise said head section; and (b) communicating said articles between said head section and said base section by way of said lift section.

13. A method as set forth in claim 11 wherein said head section is angularly swingable with respect to said base section about a vertical axis and including the step of:

(a) swinging said head section through a selected angle with respect to said base section with said movable conveyor in said extended condition.

14. A method as set forth in claim 11 and including the step of:

(a) guiding said movable conveyor during said moving by conveyor guide means extending from said first location part way toward said second location.

* * * * *